US010843758B2

United States Patent
Hebert et al.

(10) Patent No.: US 10,843,758 B2
(45) Date of Patent: Nov. 24, 2020

(54) VEHICLE HAVING A SUSPENSION ASSEMBLY INCLUDING A SWING ARM

(71) Applicant: BOMBARDIER RECREATIONAL PRODUCTS INC., Valcourt (CA)

(72) Inventors: Sebastien Hebert, Sherbrooke (CA); Emile Maltais-Larouche, Valcourt (CA); Charles Lachance, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/634,705

(22) PCT Filed: Jul. 27, 2018

(86) PCT No.: PCT/IB2018/055651
§ 371 (c)(1),
(2) Date: Jan. 28, 2020

(87) PCT Pub. No.: WO2019/025927
PCT Pub. Date: Feb. 7, 2019

(65) Prior Publication Data
US 2020/0216134 A1 Jul. 9, 2020

Related U.S. Application Data

(63) Continuation-in-part of application No. 16/073,718, filed as application No. PCT/IB2017/050492 on Jan. 30, 2017.
(Continued)

(51) Int. Cl.
*B62K 5/05* (2013.01)
*B62K 5/027* (2013.01)
(Continued)

(52) U.S. Cl.
CPC .................. *B62K 5/05* (2013.01); *B62J 1/00* (2013.01); *B62J 35/00* (2013.01); *B62K 5/027* (2013.01);
(Continued)

(58) Field of Classification Search
CPC ......... B62K 5/05; B62K 25/005; B62K 5/027
See application file for complete search history.

(56) References Cited

U.S. PATENT DOCUMENTS 4,415,057 A 11/1983 Yamaguchi
4,489,803 A 12/1984 Fukuchi
(Continued)

FOREIGN PATENT DOCUMENTS

EP 2348201 A1 7/2011
WO 2015036983 A2 3/2015
(Continued)

OTHER PUBLICATIONS

International Search Report of PCT/IB2018/055651; Shane Thomas; dated Jan. 11, 2019.
(Continued)

*Primary Examiner* — Ruth Ilan
(74) *Attorney, Agent, or Firm* — BCF LLP

(57) ABSTRACT

A vehicle includes a frame; two front ground-engaging members connected to the frame; a rear ground-engaging member connected to the frame; an engine supported by the frame; a powertrain operatively connecting the engine to the rear ground-engaging member; a seat connected to the frame; an exhaust system connected to the engine and supported by the frame; a swing arm operatively connecting the rear ground-engaging member to the frame; and a rear suspension operatively connected between the swing arm and the frame. The seat is positioned at least partially above the swing arm. The exhaust system is positioned at least partially below the swing arm. Each of the rear suspension
(Continued)

and the powertrain is at least partially concealed by the swing arm from at least two of a top, a left side or a right side of the vehicle.

20 Claims, 18 Drawing Sheets

Related U.S. Application Data

(60) Provisional application No. 62/539,023, filed on Jul. 31, 2017, provisional application No. 62/289,155, filed on Jan. 29, 2016.

(51) Int. Cl.
  *B62M 7/02* (2006.01)
  *B62M 17/00* (2006.01)
  *B62M 9/06* (2006.01)
  *B62J 35/00* (2006.01)
  *B62K 5/08* (2006.01)
  *B62K 25/00* (2006.01)
  *B62M 9/08* (2006.01)
  *B62J 1/00* (2006.01)

(52) U.S. Cl.
  CPC .............. *B62K 5/08* (2013.01); *B62K 25/005* (2013.01); *B62M 7/02* (2013.01); *B62M 9/06* (2013.01); *B62M 9/08* (2013.01); *B62M 17/00* (2013.01)

(56) References Cited

U.S. PATENT DOCUMENTS

| | | |
|---|---|---|
| 4,787,470 A | 11/1988 | Badsey |
| 4,830,391 A | 5/1989 | Silk |
| RE34,897 E | 4/1995 | Richardson et al. |
| 6,024,185 A | 2/2000 | Okada et al. |
| 6,948,581 B2 | 9/2005 | Audet et al. |
| 7,237,637 B2 | 7/2007 | Audet et al. |
| 7,416,946 B2 | 8/2008 | Park |
| 7,464,781 B2 | 12/2008 | Aube et al. |
| 7,543,672 B2 | 6/2009 | Codere et al. |
| 7,568,541 B2 | 8/2009 | Fulks et al. |
| 7,571,787 B2 | 8/2009 | Saiki |
| 7,588,110 B2 | 9/2009 | Martino |
| 7,610,979 B1 | 11/2009 | Dykowski et al. |
| 7,770,683 B2 | 1/2010 | Fischer et al. |
| 7,665,742 B2 | 2/2010 | Fulks et al. |
| 7,806,215 B2 | 10/2010 | Codere et al. |
| 7,926,607 B2 | 4/2011 | Seiter |
| 7,997,372 B2 | 8/2011 | Maltais |
| 8,006,798 B2 | 8/2011 | Portelance |
| 8,074,759 B2 | 12/2011 | Morin et al. |
| 8,086,382 B2 | 12/2011 | Dagenais et al. |
| 8,260,535 B2 | 9/2012 | Dagenais |
| 8,393,306 B2 | 3/2013 | Schiffer et al. |
| 8,438,942 B2 | 5/2013 | Gilbert et al. |
| 8,544,587 B2 | 10/2013 | Aramayo et al. |
| 8,577,588 B2 | 11/2013 | Dagenais |
| 8,655,565 B2 | 2/2014 | Dagenais et al. |
| 8,695,746 B2 | 4/2014 | Holroyd et al. |
| 8,985,610 B2 | 3/2015 | Ching |
| 9,004,214 B2 | 4/2015 | Aramayo et al. |
| 9,020,744 B2 | 4/2015 | Dagenais |
| 9,043,111 B2 | 5/2015 | Dagenais et al. |
| 2003/0221890 A1 | 12/2003 | Fecteau et al. |
| 2005/0039967 A1 | 2/2005 | Aube et al. |
| 2005/0116437 A1 | 6/2005 | Furukawa et al. |
| 2006/0254842 A1 | 11/2006 | Dagenais et al. |
| 2007/0199756 A1 | 8/2007 | Kofuji |
| 2007/0256882 A1 | 11/2007 | Bedard et al. |
| 2009/0007878 A1 | 1/2009 | Korenjak et al. |
| 2009/0057046 A1 | 3/2009 | Kofuji |
| 2009/0321169 A1 | 5/2009 | Chadha |
| 2009/0152940 A1 | 6/2009 | Jonasch et al. |
| 2010/0263956 A1 | 10/2010 | Bedard et al. |
| 2011/0079458 A1 | 4/2011 | Nishiyama et al. |
| 2011/0108346 A1 | 5/2011 | Nimura et al. |
| 2011/0168473 A1 | 7/2011 | Bedard et al. |
| 2013/0186701 A1 | 7/2013 | Bedard et al. |
| 2014/0131131 A1 | 5/2014 | Marois et al. |
| 2015/0073643 A1 | 3/2015 | Hall et al. |
| 2015/0122567 A1 | 5/2015 | Laroche et al. |
| 2015/0175209 A1 | 6/2015 | Aramato et al. |
| 2015/0274213 A1 | 10/2015 | Rudwal et al. |
| 2017/0057583 A1 | 3/2017 | Yokoyama |
| 2017/0129562 A1 | 5/2017 | Hirakawa et al. |

FOREIGN PATENT DOCUMENTS

| | | |
|---|---|---|
| WO | 2015036984 | 3/2015 |
| WO | 2015036985 | 3/2015 |
| WO | 2015079425 | 6/2015 |
| WO | 2015079426 | 6/2015 |

OTHER PUBLICATIONS

Sport Racer Network, Front Suspension Picture, retrieved from http://sports.racer.net/chassis/stohr/images/wf1/suspension_front.jpg on Jan. 28, 2020.
International Search Report of PCT/IB2017/050492; Lee W. Young; dated May 19, 2017.
International Preliminary Report on Patentability issued in corresponding International No. PCT/IB2018/055651 dated Sep. 16, 2019.
Supplementary European Search Report from EP Corresponding Application No. 18841108.6; dated Jun. 16, 2020; The Hague; Verdelho, Luis.
Extended European Search Report issued in corresponding European patent application 18841761.2 dated Jul. 20, 2020.

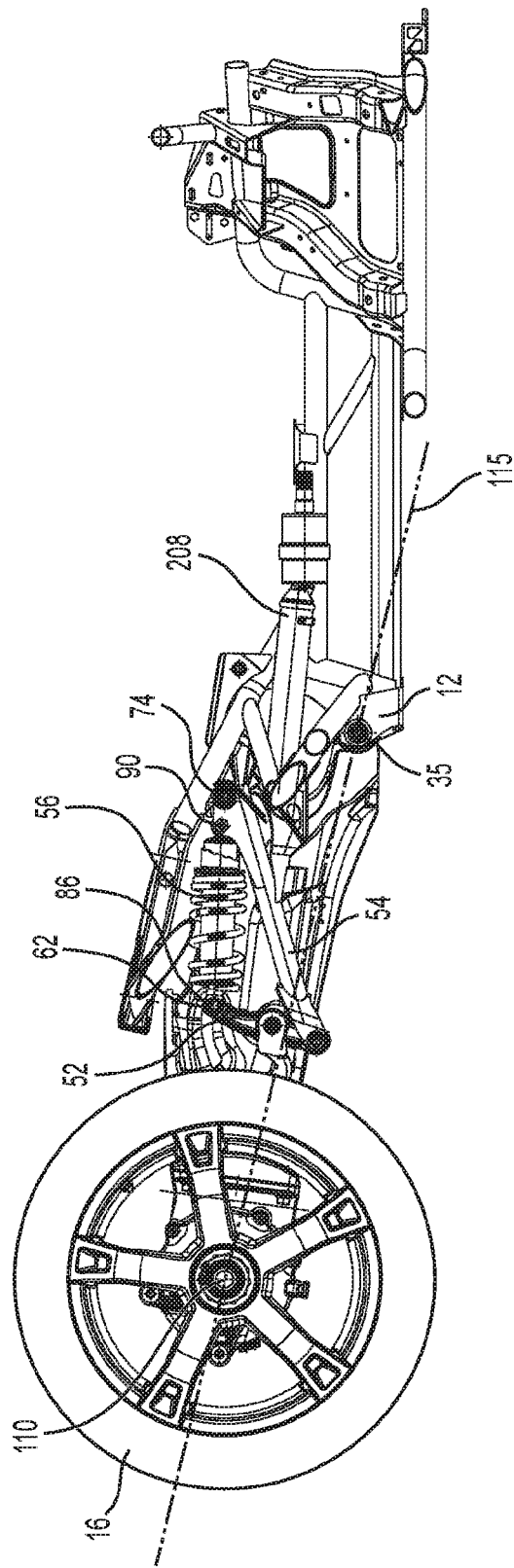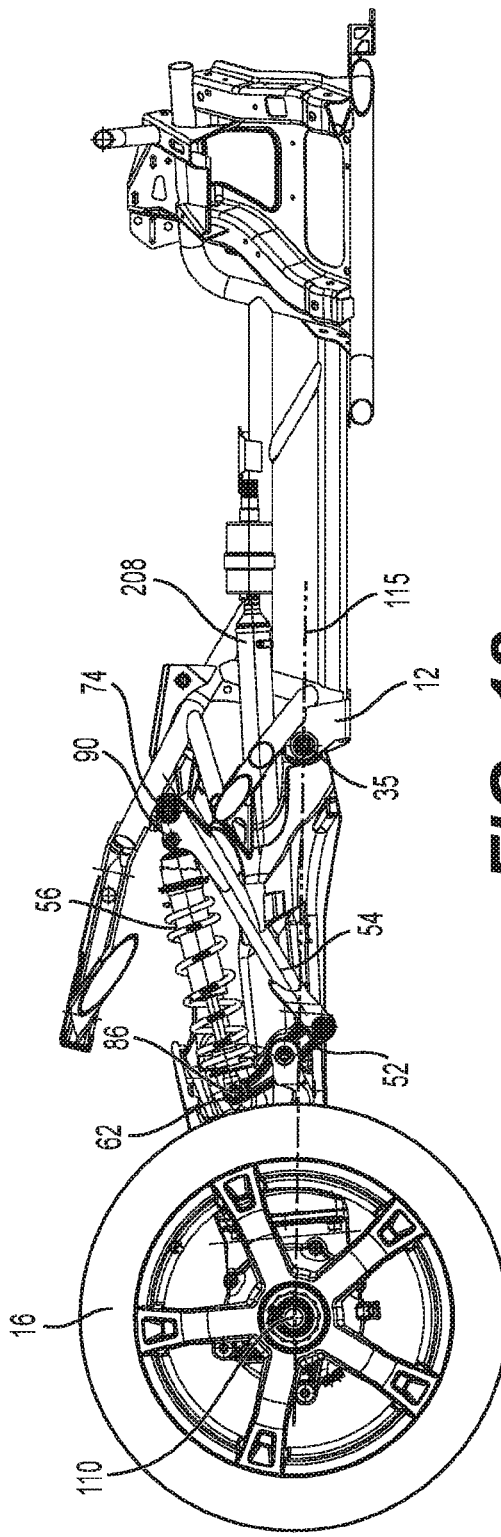
FIG. 17
FIG. 18

VEHICLE HAVING A SUSPENSION ASSEMBLY INCLUDING A SWING ARM

CROSS-REFERENCE

The present application claims priority to U.S. Provisional Patent Application No. 62/539,023, filed on Jul. 31, 2017, the entirety of which is incorporated herein by reference. For purposes of the United States, the present application is also a continuation-in-part of PCT Patent Application No. PCT/IB2017/050492, filed on Jan. 30, 2017, which claims priority to U.S. Provisional Patent Application No. 62/289,155, filed on Jan. 29, 2016, the entirety of each of which is incorporated herein by reference.

FIELD OF TECHNOLOGY

The present technology relates to a vehicle having a suspension assembly including a swing arm, and in particular to a three-wheeled vehicle having such a suspension assembly.

BACKGROUND

Three-wheeled straddle-seat vehicles have been developed for road use with a desire to combine the riding qualities experienced in four wheeled automobiles and two wheeled motorcycles. Such three-wheeled vehicles often have a single rear wheel suspended by a rear swing arm.

A problem often encountered on such vehicles is that the rear swing arm leaves rear components of the vehicle that are connected to it, including for example a rear suspension (e.g., a shock absorber) that will control motion of the swing arm relative to the vehicle's frame exposed. As such, these rear components may be damaged by debris.

Furthermore, non-leaning vehicles including such three-wheeled vehicles having a swing arm are subjected to torsional loads that are otherwise not encountered in leaning vehicles (e.g., two wheeled motorcycles).

There is therefore a desire for a vehicle having a rear suspension assembly including a swing arm that at least partially alleviates one or more of these drawbacks.

SUMMARY

It is an object of the present technology to ameliorate at least some of the inconveniences described above.

In accordance with one aspect of the present technology, there is provided a vehicle including: a frame; two front ground-engaging members connected to the frame; a rear ground-engaging member connected to the frame; an engine supported by the frame; a powertrain operatively connecting the engine to the rear ground-engaging member; a seat connected to the frame; an exhaust system connected to the engine and supported by the frame; a swing arm operatively connecting the rear ground-engaging member to the frame; and a rear suspension operatively connected between the swing arm and the frame. The seat is positioned at least partially above the swing arm. The exhaust system is positioned at least partially below the swing arm. Each of the rear suspension and the powertrain is at least partially concealed by the swing arm from at least two of a top, a left side or a right side of the vehicle.

In some implementations, the powertrain includes a driveshaft extending rearwardly from the engine. At least a portion of the driveshaft is concealed by the swing arm from the at least two of the top, the left side and the right side of the vehicle.

In some implementations, a majority of a length of the driveshaft is concealed by the swing arm from the at least two of the top, the left side and the right side of the vehicle.

In some implementations, the swing arm defines a channel and the driveshaft extends in the channel of the swing arm.

In some implementations, the channel is bound by a top wall, a bottom wall, a left wall and a right wall.

In some implementations, the channel extends along a majority of a length of the swing arm.

In some implementations, the vehicle also includes a final drive unit connected to the swing arm and operatively connected to the rear ground-engaging member. A rear end of the driveshaft is connected to the final drive unit.

In some implementations, the exhaust system includes a muffler. At least a portion of the muffler is positioned below the swing arm.

In some implementations, the swing arm has a top portion and at least one lateral side portion extending downwardly from the top portion. The at least one lateral side portion of the swing arm is at least partially vertically aligned with a lateral side of the muffler.

In some implementations, the at least one lateral side portion of the swing arm includes a left lateral side portion and a right lateral side portion. The left lateral side portion is at least partially vertically aligned with a left side of the muffler. The right lateral side portion being at least partially vertically aligned with a right side of the muffler.

In some implementations, the swing arm defines a pocket bound by a top wall, a bottom wall, a left lateral side wall and a right lateral side wall of the swing arm. The rear suspension is at least partially received in the pocket of the swing arm.

In some implementations, the exhaust system includes a muffler and the rear suspension includes a shock absorber. The shock absorber is positioned vertically between the muffler and the seat.

In some implementations, the exhaust system includes a muffler having a left side and a right side. The swing arm is pivotally mounted to the frame via at least two laterally-spaced mount points. The mount points are positioned laterally outward from the left and right sides of the muffler.

In some implementations, the at least two of the top, the left side or the right side of the vehicle includes the left and right sides of the vehicle.

In some implementations, the at least two of the top, the left side or the right side of the vehicle includes the top and the left side of the vehicle.

In some implementations, the at least two of the top, the left side or the right side of the vehicle includes the top and the right side of the vehicle In some implementations, the at least two of the top, the left side or the right side of the vehicle includes the top, the left side and the right side of the vehicle.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction. Moreover, the term "above" as used herein signifies being vertically higher and simultaneously laterally and longitudinally aligned. Similarly, the term "below" as used herein signifies being vertically lower and simultaneously laterally and longitudinally aligned.

Explanations and/or definitions of terms provided in the present application take precedence over explanations and/or definitions of these terms that may be found in the documents incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 17 is a cross-sectional right side elevation view of the vehicle as shown in FIG. 4 showing the rear suspension assembly in a full bump state;

FIG. 18 is a cross-sectional right side elevation view of the vehicle as shown in FIG. 4 showing the rear suspension assembly in a full droop state;

It should also be noted that, unless otherwise explicitly specified herein, the drawings are not necessarily to scale.

DETAILED DESCRIPTION

The present technology will be described herein with respect to a three-wheeled straddle-type vehicle 10. It is contemplated that at least some aspects of the present technology could also be implemented with vehicles having two, four, or more wheels. The present technology will be described herein with respect to a rear swing arm suspension assembly, although it is contemplated that at least some aspects of the present technology could also be implemented in a front swing arm suspension assembly.

Figure 1:
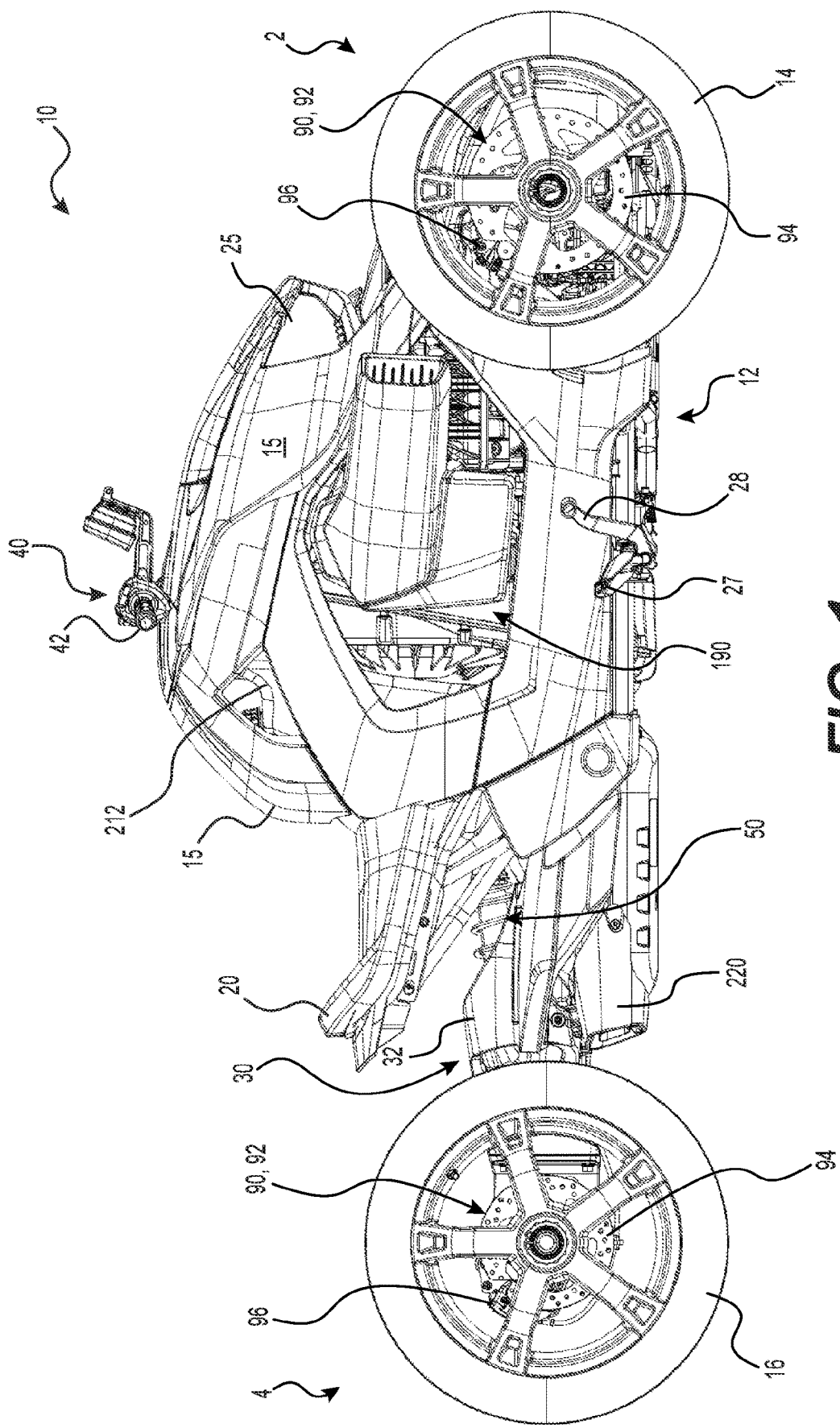
FIG. 1 is a right side elevation view of a vehicle according to the present technology.
Figure 2:
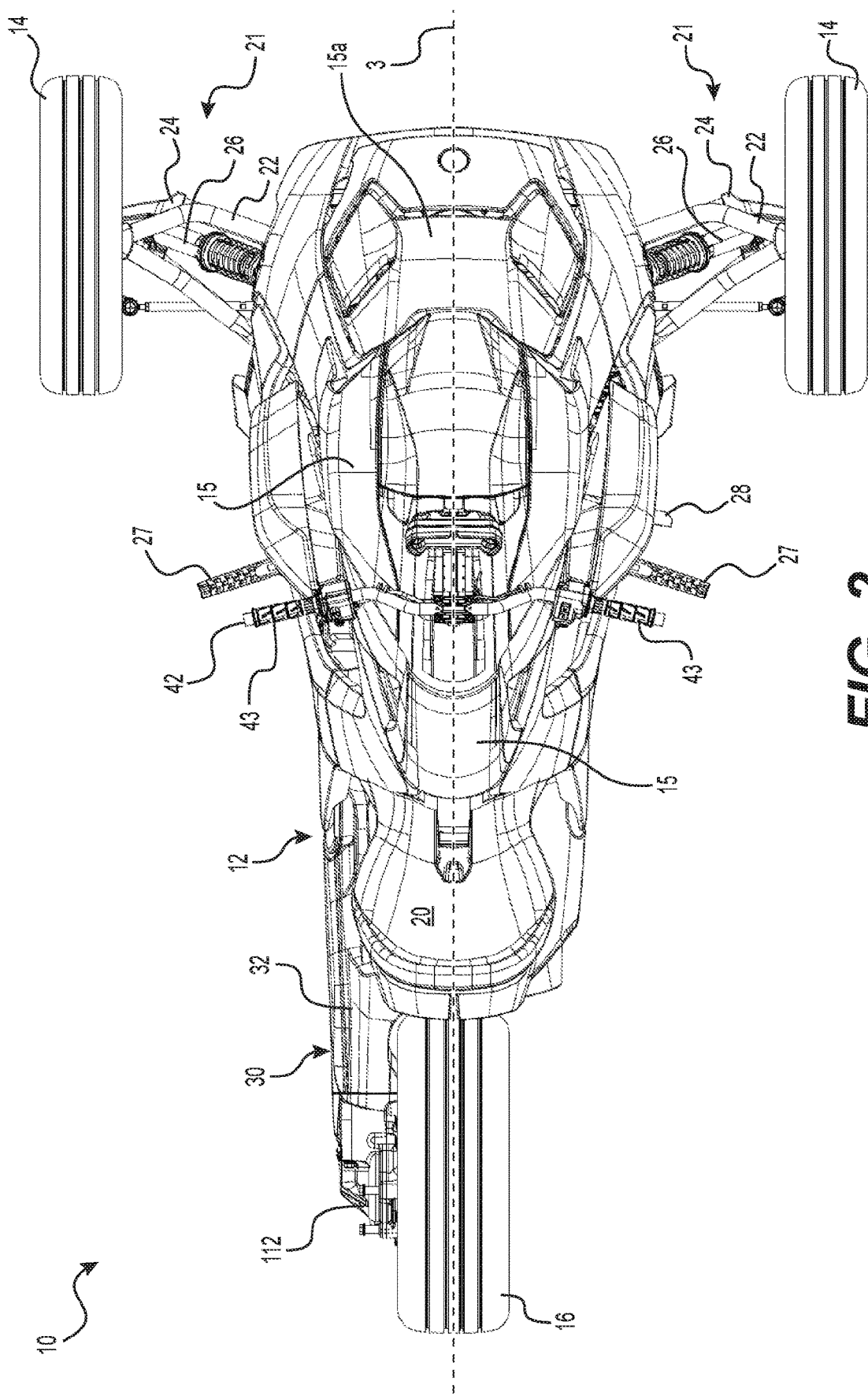
FIG. 2 is a top plan view of the vehicle of FIG. 1.

With reference to FIGS. 1 and 2, a vehicle 10 has a front end 2, a rear end 4, and a longitudinal centerplane 3 defined consistently with the forward travel direction of the vehicle 10. The vehicle 10 has a frame 12 on which various components of the vehicle 10 are supported.

The vehicle 10 is a three-wheeled vehicle including a left front wheel 14 mounted to the frame 12 by a left front suspension assembly 20 and a right front wheel 14 mounted to the frame 12 by a right front suspension assembly 20. The vehicle 10 also comprises single rear wheel 16 supported by a rear suspension assembly 30 of the vehicle 10. The left and right front wheels 14 and the rear wheel 16 each have a tire secured thereto. The front wheels 14 are disposed equidistant from the longitudinal centerplane 3, and the rear wheel 16 is centered with respect to the longitudinal centerplane 3. It is contemplated that aspects of the present technology could also be implemented on a vehicle with two rear wheels 16 and a single, centered front wheel 14.

Figure 4:
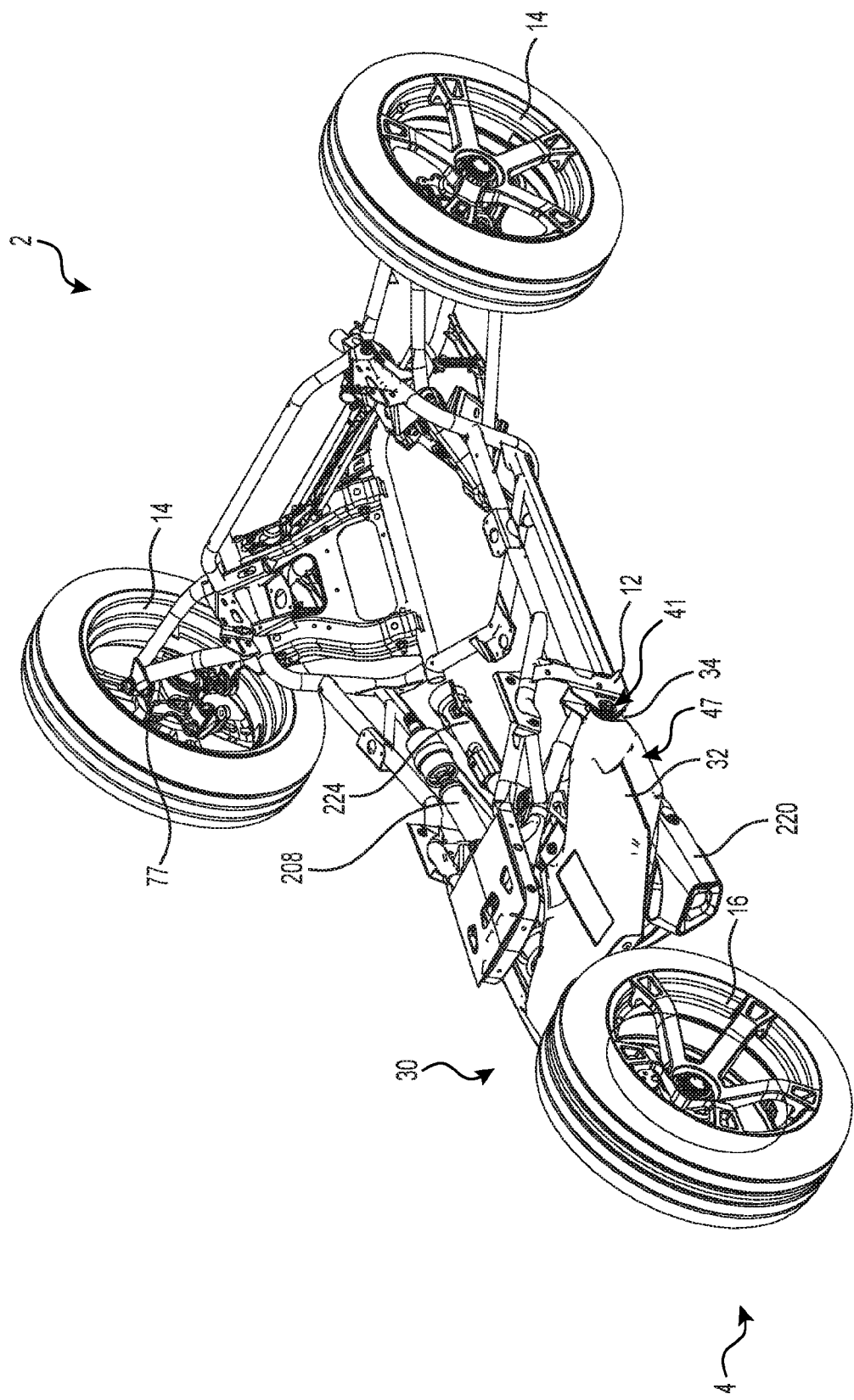
FIG. 4 is a rear, right side perspective view of the vehicle of FIG. 1 with certain components removed to expose part of a frame and a rear suspension assembly of the vehicle of FIG. 1.
Figure 5:
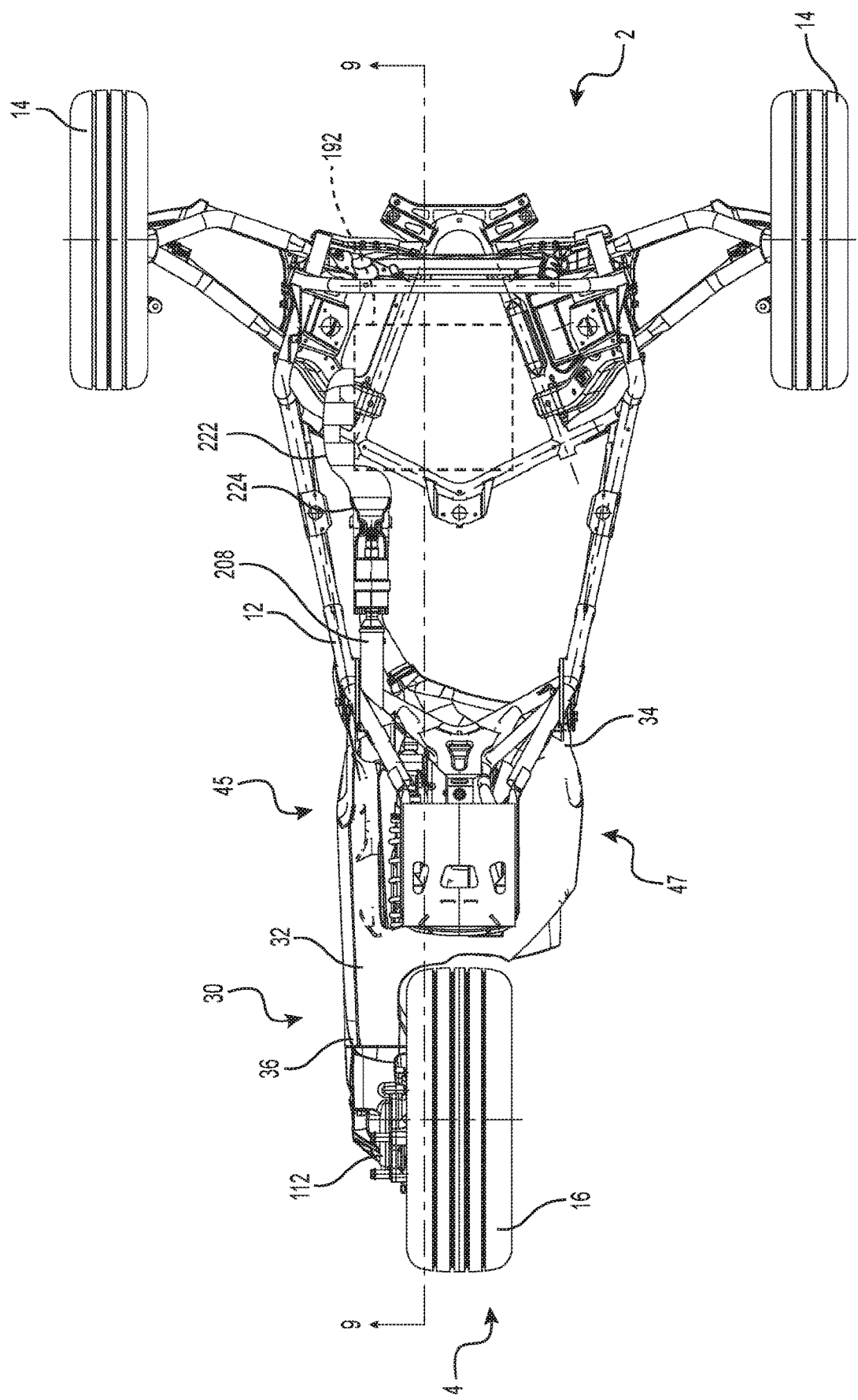
FIGS. 5 and 6 are top and bottom plan views respectively of the vehicle as shown in FIG. 4.

In the illustrated implementation and as can be seen in FIGS. 2 and 4, each front suspension assembly 21 is a double A-arm type suspension, also known as a double wishbone suspension. It is contemplated that other types of suspensions, such as a McPherson strut suspension, or a swing arm suspension could be used. Each front suspension assembly 21 includes an upper A-arm 22, a lower A-arm 24 and a shock absorber 26. The right front suspension assembly 21 is a mirror image of the left front suspension assembly 21, and as such only the left front suspension assembly 21 will be described herein. Each A-arm 22, 24 has a front member and a rear member. The laterally outer ends of the front and rear members are connected to each other while the laterally inner ends of the front and rear members of each A-arm 22, 24 are spaced apart from each other.

The lower end of the shock absorber 26 is connected to the front and rear members of the lower A-arm 24 slightly laterally inward of the laterally outer ends. The laterally inner ends of the upper and lower A-arms 22, 24 are pivotally connected to the frame 12. As can be seen in FIG. 4, the laterally outer ends of the upper and lower A-arms 22, 24 are pivotally connected to the top and bottom respectively of a knuckle 77. The front wheel 14 is connected to a spindle that is connected to the knuckle 77.

As shown in FIG. 4, the rear suspension assembly 30 comprises a swing arm 32 that is pivotally mounted at a proximal end 34 thereof to the frame 12. The rear wheel 16 is rotatably mounted to a distal end 36 of the swing arm 32 which extends on a left side of the rear wheel 16. More specifically, the rear wheel 16 is rotatable about a wheel rotation axis 110 via a final drive unit 112 affixed (e.g., fastened) to the distal end 36 of the swing arm 32 that receives the distal end of a driveshaft 208 (see FIG. 4) and the gears associated therewith for providing motive power to the rear wheel 16. With reference to FIGS. 3, 4, 17 and 18, the driveshaft 208 extends from the power pack 190 to the final drive unit 112, passing in part through the swing arm 32. As will be described in more detail below, the rear suspension assembly 30 comprises a rear suspension 50 (which may also be referred to as a "linkage subassembly") connected between the swing arm 32 and the frame 12.

The vehicle 10 has a straddle seat 20 mounted to the frame 12 and disposed along the longitudinal centerplane 3. As best seen in FIG. 2, the straddle seat 20 is positioned in part above the swing arm 32. In other words, a part of the straddle seat 20 is positioned vertically higher than the swing arm 32 and is also laterally and longitudinally aligned with the swing arm 32. In the illustrated implementation, the straddle seat 20 is intended to accommodate a single adult-sized rider, i.e. the driver. It is however contemplated that a passenger seat portion could be connected to the frame 12 in order to accommodate a passenger behind the driver.

A driver footrest 27 is disposed on either side of the vehicle 10 and vertically lower than the straddle seat 20 to support the driver's feet (see FIGS. 1 and 2). The driver footrests 27 are connected to the frame 12. In the implementation of the vehicle 10 illustrated herein, the driver footrests 27 are in the form of foot pegs disposed longitudinally forward of the straddle seat 20. It is also contemplated that the footrests 27 could be in the form of footboards. It is contemplated that the vehicle 10 could also be provided with one or more passenger footrests disposed rearward of the driver footrest 27 on each side of the vehicle 10, for supporting a passenger's feet when a passenger seat portion for accommodating a passenger is connected to the vehicle 10. A brake pedal 28 is connected to the right driver footrest 27 for braking the vehicle 10. The brake pedal 28 extends upwardly and forwardly from the right driver footrest 27 such that the driver can actuate the brake pedal 28 with a front portion of the right foot while a rear portion of the right foot remains on the right driver footrest 27.

The vehicle 10 includes a steering assembly 40. A handlebar 42, which is part of the steering assembly 40, is disposed in front of the seat 20. The handlebar 42 is used by the driver to turn the front wheels 14 to steer the vehicle 10. A left hand grip 43 is placed around the left side of the handlebar 42 near the left end thereof and a right hand grip 43 is placed around the right side of the handlebar 42 near the right end to facilitate gripping for turning the handlebar 42 and thereby steering the vehicle 10. The right hand grip 43 provides twist-grip type throttle control. It is contemplated that the brake pedal 28 could be positioned on the opposite lateral side of the vehicle 10 or replaced with a brake lever at either the left or right hand grips 43.

A central portion of the handlebar 42 is connected to an upper end of a steering column (not shown). From the handlebar 42, the steering column 44 extends downwardly and leftwardly. The steering column is rotatably supported by the frame 12. A bottom portion of the steering column is operatively connected to the front wheels 14 for steering the vehicle 10. In implementations of a vehicle having a single front wheel, the steering column could be differently implemented, for example in the form of a triple clamp.

Figure 3:
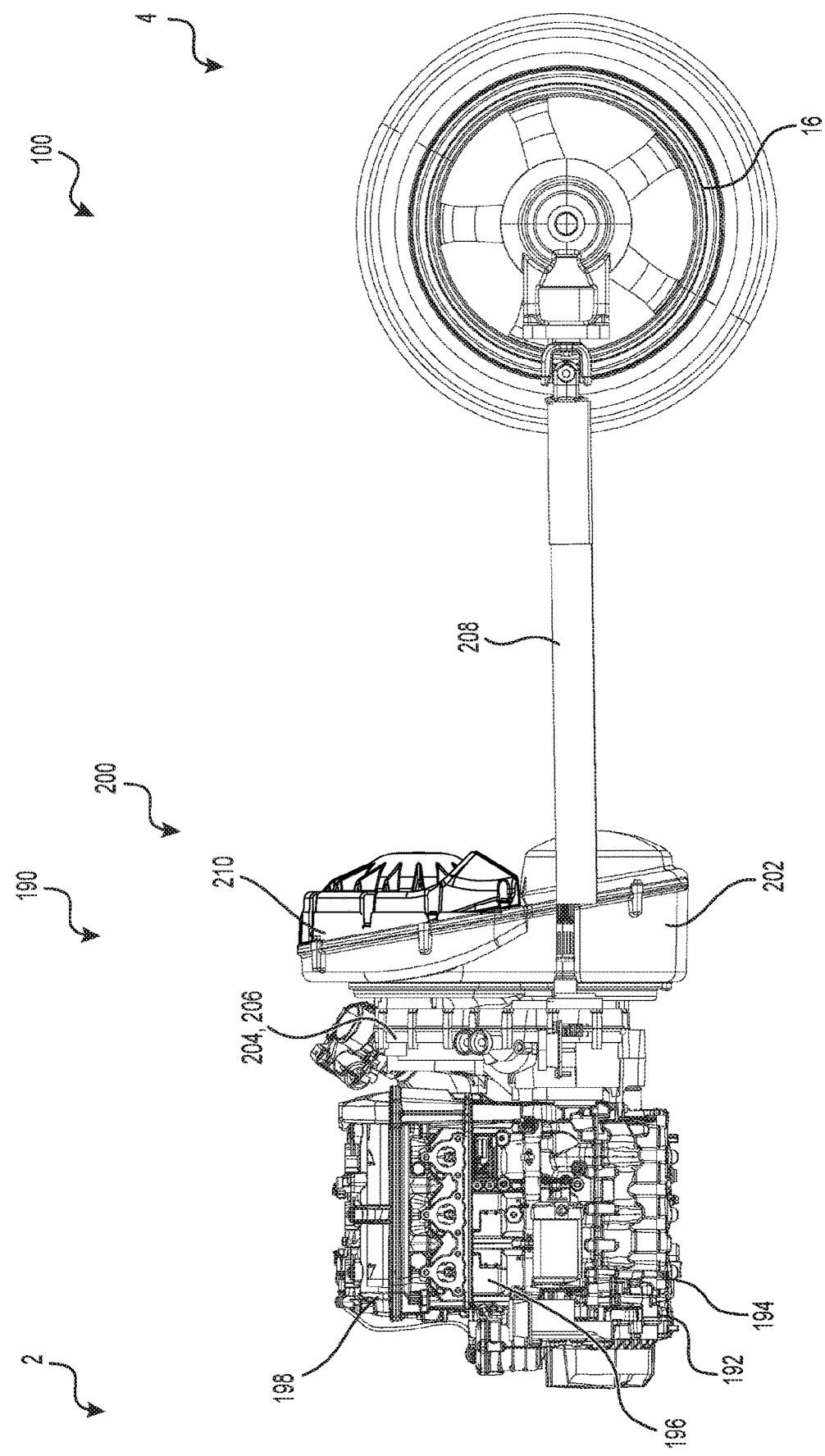
FIG. 3 is a left side elevation view of a portion of a powertrain and a rear wheel of the vehicle of FIG. 1.

As can be seen in FIGS. 1 and 3, the vehicle 10 includes a power pack 190, including a motor 192 and a transmission assembly 200. The transmission assembly 200 includes a continuously variable transmission (CVT) 202 and a transfer case 204 in the present implementation. The power pack 190 is supported by the frame 12. In the illustrated implementation of the vehicle 10, the motor 192 is in the form of an internal combustion engine. It is however contemplated that the motor 192 could be other than an internal combustion engine, for example an electric motor, a hybrid or the like. The motor 192 will be referred to hereinafter as engine 192 for convenience. The engine 192 is operatively connected to the rear wheel 16 to drive the rear wheel 16.

As can be seen in FIG. 3, the engine 192 has a crankcase 194, a cylinder block 196 disposed on and connected to the crankcase 194, and a cylinder head assembly 198 disposed on and connected to the cylinder block 196. Further detail regarding engines, such as the engine 192, can be found in U.S. Pat. No. 8,393,306 B2, issued on Mar. 12, 2013, the entirety of which is incorporated herein by reference.

The rear wheel 16 is operatively connected to a crankshaft (not shown) of the engine 192 via an engine output shaft (not shown), the CVT 202, the transfer case 204 and the driveshaft 208. It is contemplated that the engine 192 could be connected to the front wheels 14 instead of, or in addition to, the rear wheel 16. The engine 192, the CVT 202, the transfer case 204 and the driveshaft 208 form part of a vehicle powertrain 100. Power produced by the engine 192 is transmitted to the CVT 202, then to the transfer case 204, which in turn drives the driveshaft 208 to turn the rear wheel 16.

As can be seen in FIG. 3, the transfer case 204 is disposed rearward of the engine 192. The transfer case 204 includes a transfer case housing 206 which is mounted to the rear end of the engine 192 via the cylinder block 196 and the crankcase 194. The CVT 202 is disposed rearward of the transfer case 204 and includes a CVT housing 210. It is contemplated that the vehicle 10 could have a transmission assembly 200 in which the CVT 202 and the transfer case 204 are replaced by a discrete gear transmission or another type of manual, semi-automatic or automatic transmissions.

A front end of the driveshaft 208 is enclosed by the transfer case housing 206. The driveshaft 208 extends longitudinally and rearwardly out of the transfer case housing 206 on a left side of the longitudinal centerplane 3. The rear end of the driveshaft 208 is operatively connected to the rear wheel 16 (via the final drive unit 112) to drive the rear wheel 16 without inhibiting motion of the rear wheel 16 about the rear suspension assembly 30 as the vehicle 10 moves over uneven terrain. It is contemplated that the driveshaft 208 could be omitted and the transfer case 204 could be connected to the rear wheel 16 via a chain, belt, or other transmission assembly instead of the driveshaft 208.

Turning back to FIGS. 1 and 2, the vehicle 10 includes body panels 15 which are connected to and supported by the frame 12. The body panels 15 enclose and protect the internal components of the vehicle 10 such as the engine 192. The body panels 15 include a hood 15a disposed at the front of the vehicle 10 between the front wheels 14. The vehicle 10 also includes headlights 25 connected to and supported by the frame 12.

As can be seen in FIG. 1, a fuel tank 212 disposed behind the CVT 202 supplies fuel to the engine 192. The straddle seat 20 is disposed longitudinally rearward of the fuel tank 212. The fuel tank 212 is connected to and supported by the frame 12. The fuel tank 212 includes a fuel filler neck opening.

Figure 22:
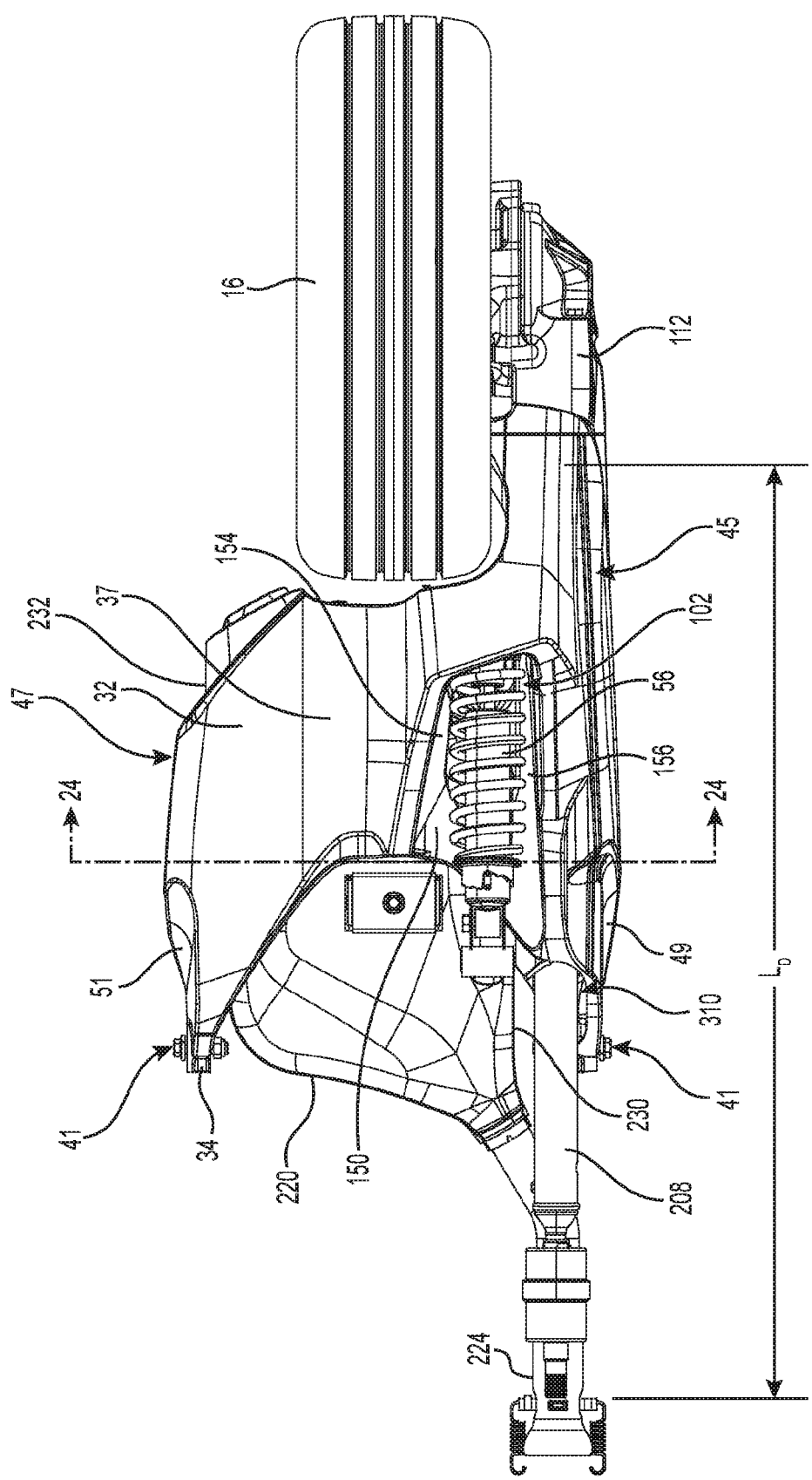
FIG. 22 is a top plan view of the vehicle components shown in FIG. 21.
Figure 23:
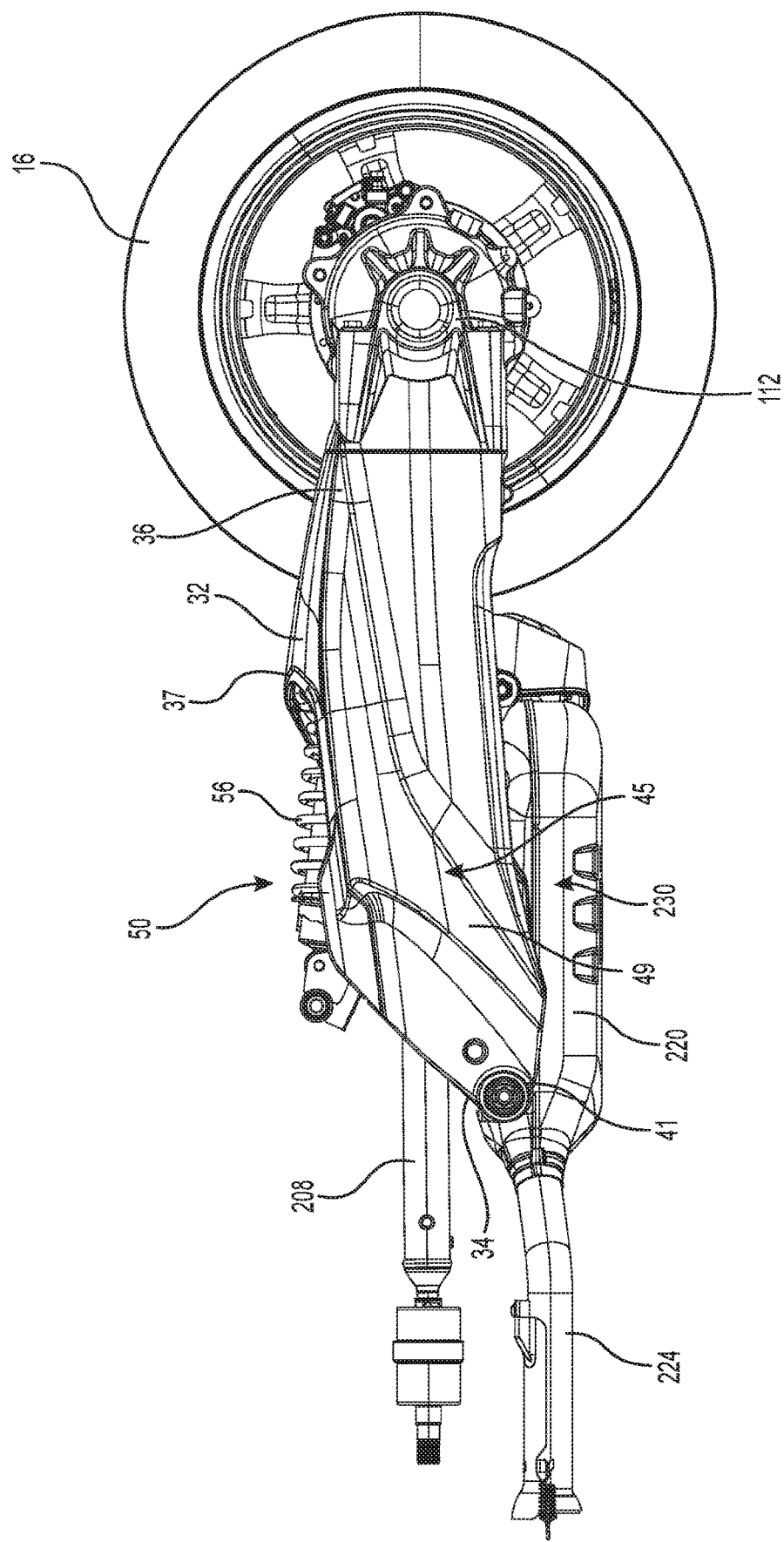
FIG. 23 is a left side elevation view of the vehicle components shown in FIG. 21.

As can be seen in FIGS. 1 and 4 to 9, the vehicle 10 also includes an exhaust system fluidly connected to the engine 192, which includes a muffler 220. The engine 192 is fluidly connected to an exhaust manifold 222 (FIG. 5) which in turn is fluidly connected to an exhaust conduit 224 extending longitudinally and rearwardly from the engine 192. The exhaust conduit 224 fluidly connects to the muffler 220. As shown in FIGS. 1 and 2, the muffler 220 is positioned such that a portion of the muffler 220 is below the seat 20. More particularly, a majority of the muffler 220 is positioned below the seat 20. Moreover, as best seen in FIG. 22, a portion of the muffler 220 is positioned below a portion of the swing arm 32. As such, the swing arm 32 covers part of the muffler 220. In the illustrated implementation, the muffler 220 is laterally centered with respect to the longitudinal centerplane 3. The muffler 220 is fastened to a muffler bracket of the frame 12. It is however contemplated that the muffler 220 could not be aligned with the seat 20 in the lateral and/or longitudinal directions. It is contemplated that the muffler 220 could not be laterally centered with respect to the longitudinal centerplane 3.

With reference to FIG. 1, each of the two front wheels 14 and the rear wheel 16 is provided with a brake assembly 90. The brake assemblies 90 of the three wheels 14, 16 form a brake system 92. Each brake assembly 90 is a disc-type brake mounted onto the spindle of the respective wheel 14 or 16. Other types of brakes are contemplated. Each brake assembly 90 includes a rotor 94 mounted onto the final drive unit 112 and a stationary caliper 96 straddling the rotor 94. The brake pads (not shown) are mounted to the caliper 96 so as to be disposed between the rotor 94 and the caliper 96 on either side of the rotor 94. The brake pedal 28 is operatively connected to the brake assemblies 90 provided on each of the two front wheels 14 and the rear wheel 16.

The configuration of the rear suspension assembly 30 and the manner in which it operates will now be described in more detail with reference to FIGS. 4 to 18.

The swing arm 32 of the rear suspension assembly 30 has a generally inverted U shape. The swing arm 32 has a top central portion 37 and a pair of swing arm extensions 49, 51, disposed on left and right lateral sides 45, 47 of the swing arm 32, extending downwardly from the top portion 37. As shown in FIGS. 1, 7, 8 and 23, the swing arm extensions 49, 51 partially conceal the muffler 220 from view on the left and right sides of the vehicle 10. Notably, the swing arm extensions 49, 51 are partially vertically aligned with respective left and right sides 230, 232 of the muffler 220. As such, when viewed from the left and right sides (i.e., in left and right orthogonal views), a respective one of the swing arm extensions 49, 51 overlaps part of the muffler 220.

The swing arm 32 is pivotally connected at its proximal end 34 to the frame 12 about a swing arm pivot axis 35 that extends laterally. More specifically, the swing arm extensions 49, 51 are each pivotally connected to the frame 12 via a respective swing arm pivot 41 to define the swing arm pivot axis 35 as will be described in greater detail below.

Figure 21:
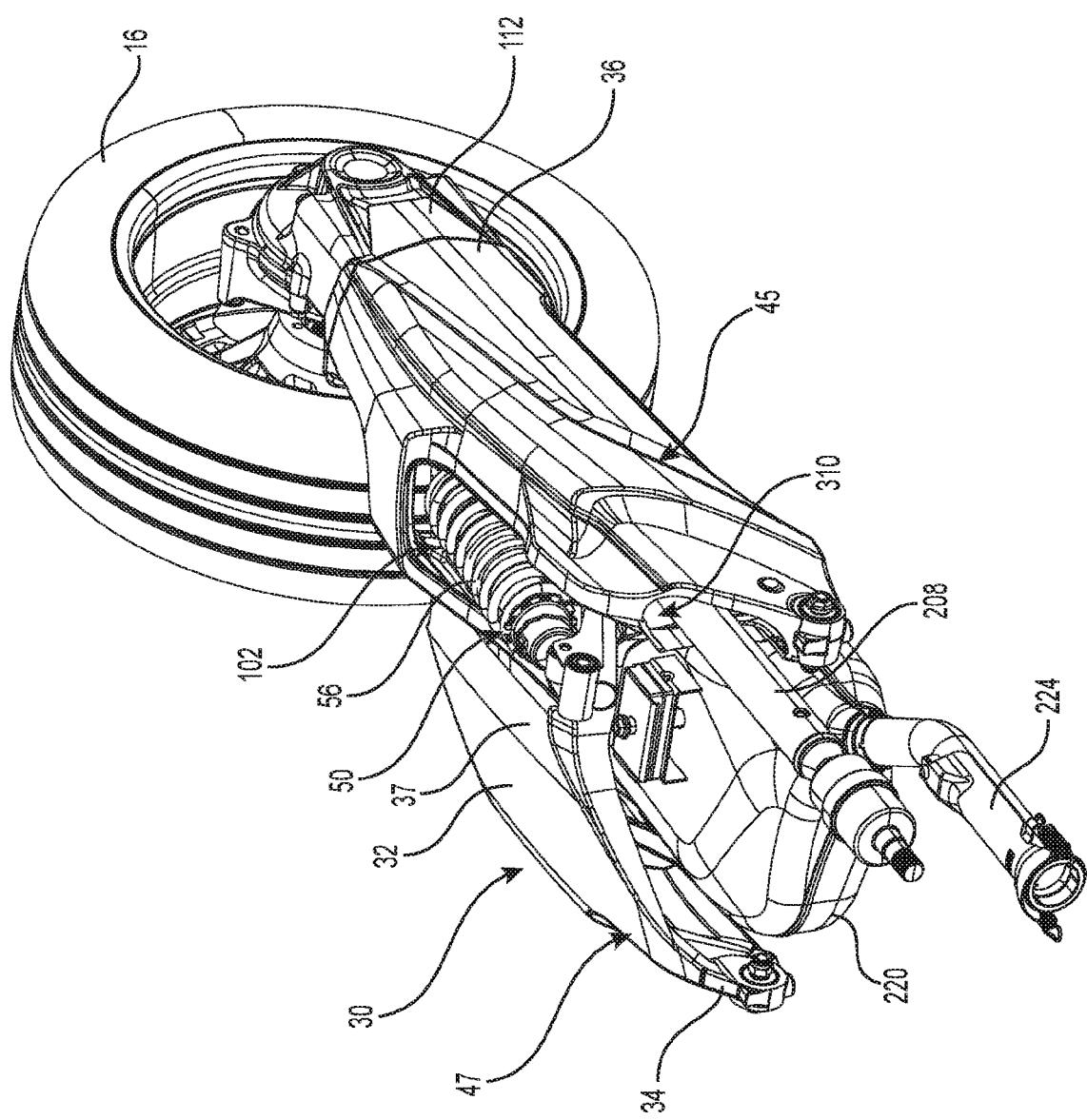
FIG. 21 is a front, left side perspective view of the rear suspension assembly of FIG. 10 and part of an exhaust system and a driveshaft of the vehicle of FIG. 1.
Figure 24:
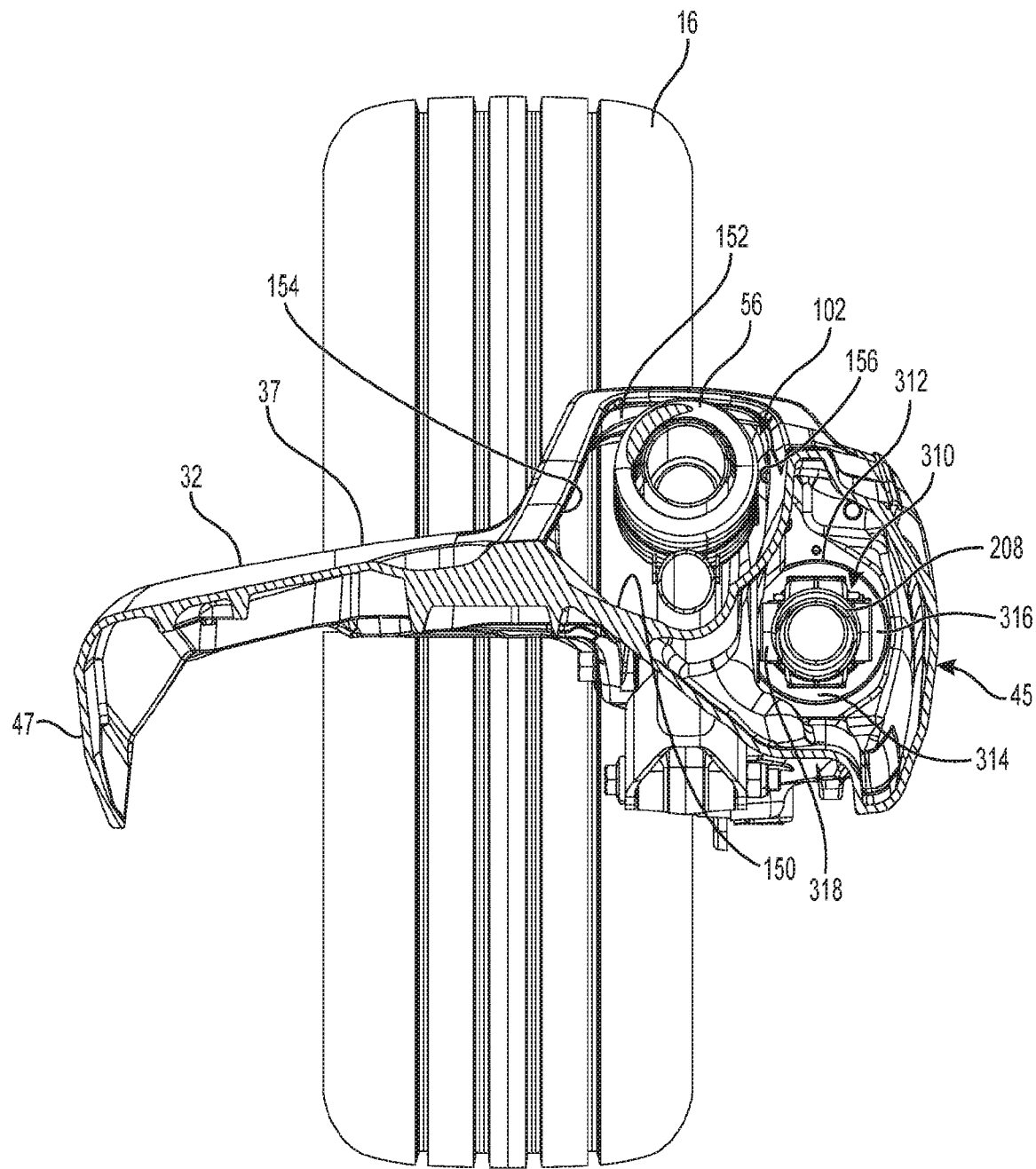
FIG. 24 is a cross-sectional view of the components of FIG. 22 taken through line 24-24 of FIG. 22, with the muffler removed for clarity.

As best seen in FIGS. 21 and 24, the swing arm 32 defines a channel 310 for receiving therein part of the driveshaft 208. As such, the driveshaft 208 is partially concealed by the swing arm 32 from a top, a left side and a right side of the vehicle 10. In other words, when the vehicle 10 is in operation on the ground and is viewed from any of the top, the left side and the right side of the vehicle 10 (i.e., in top, left side and right side orthogonal views of the vehicle 10), the swing arm 32 overlaps part of the driveshaft 208 thus blocking it from view. In this implementation, a significant proportion of the driveshaft 208 is concealed by the swing arm 32. Notably, a majority of a length $L_D$ (FIG. 22) of the driveshaft 208 extends within the channel 310 and is thus concealed by the swing arm 32. The channel 310 extends substantially longitudinally along a majority of a length of the swing arm 32 measured from the proximal end 34 to the distal end 36 thereof. The channel 310 is closed on the top, the bottom, and the left and right sides. In this implementation, as shown in FIG. 24, the channel 310 has a substantially circular cross-section such that the channel 310 is bound by a continuous wall having a top wall portion 312, a bottom wall portion 314, and left and right side wall portions 316, 318. The channel 310 is thus inaccessible from the top, bottom, and left and right sides. Rather, the channel 310 is accessed through longitudinal ends thereof.

Figure 6:
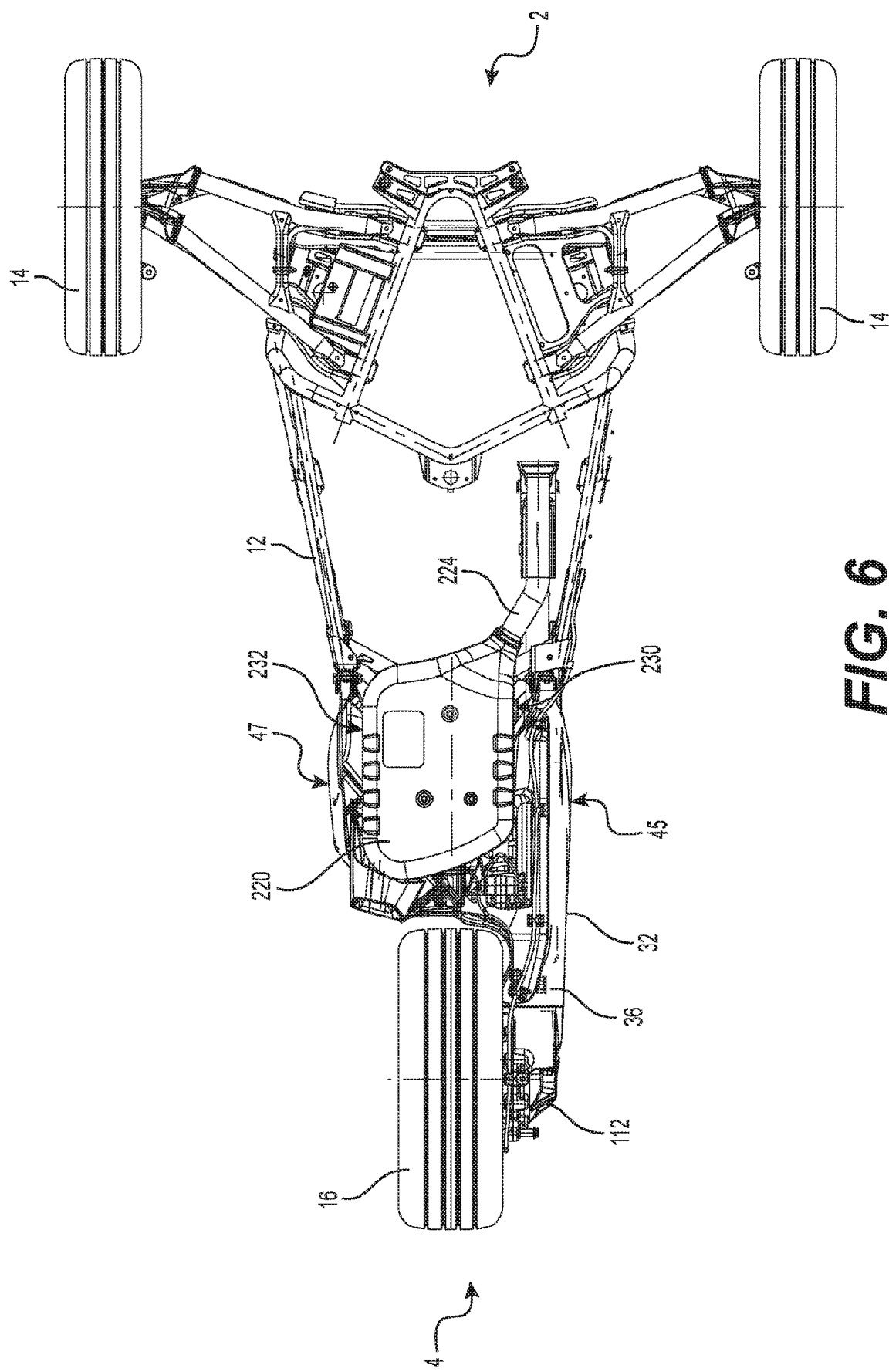
Figure 7:
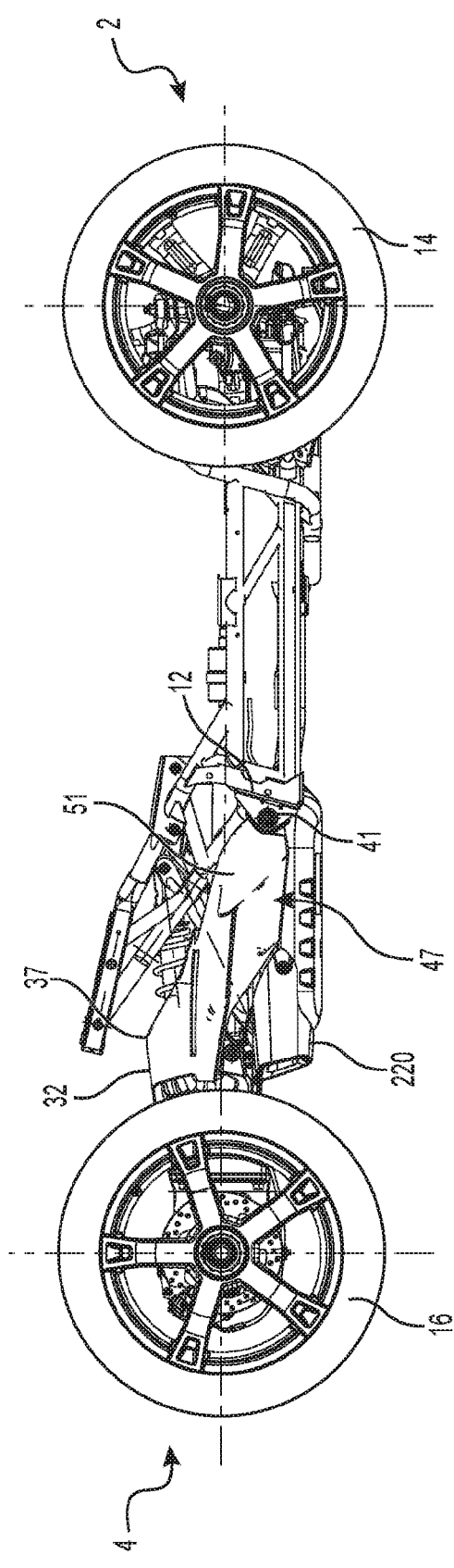
FIGS. 7 and 8 are right and left side elevation views respectively of the vehicle as shown in FIG. 4.
Figure 8:
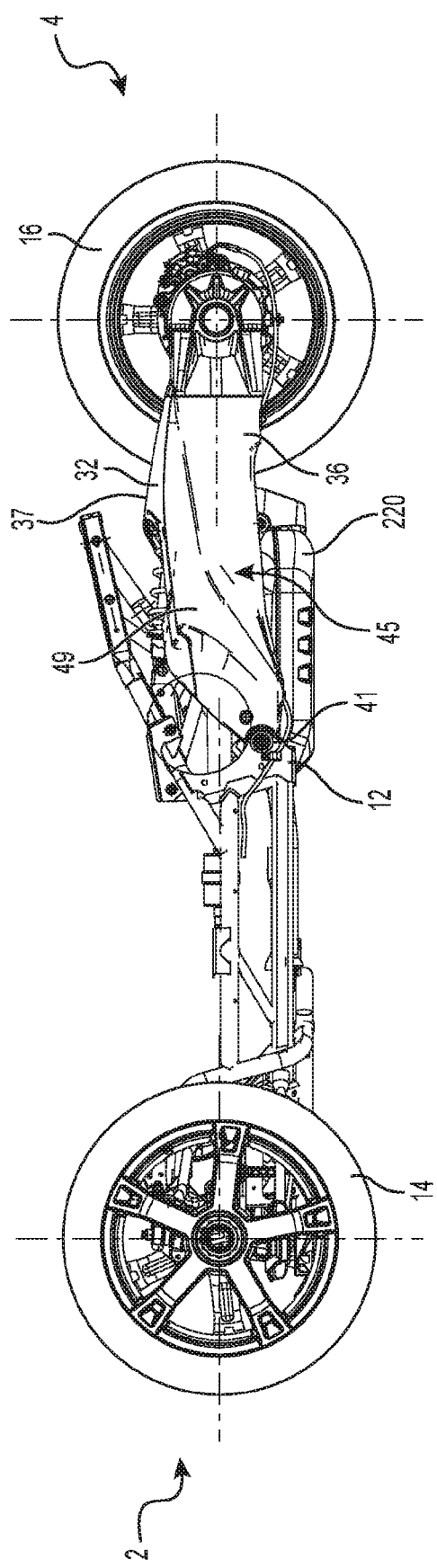
Figure 9:
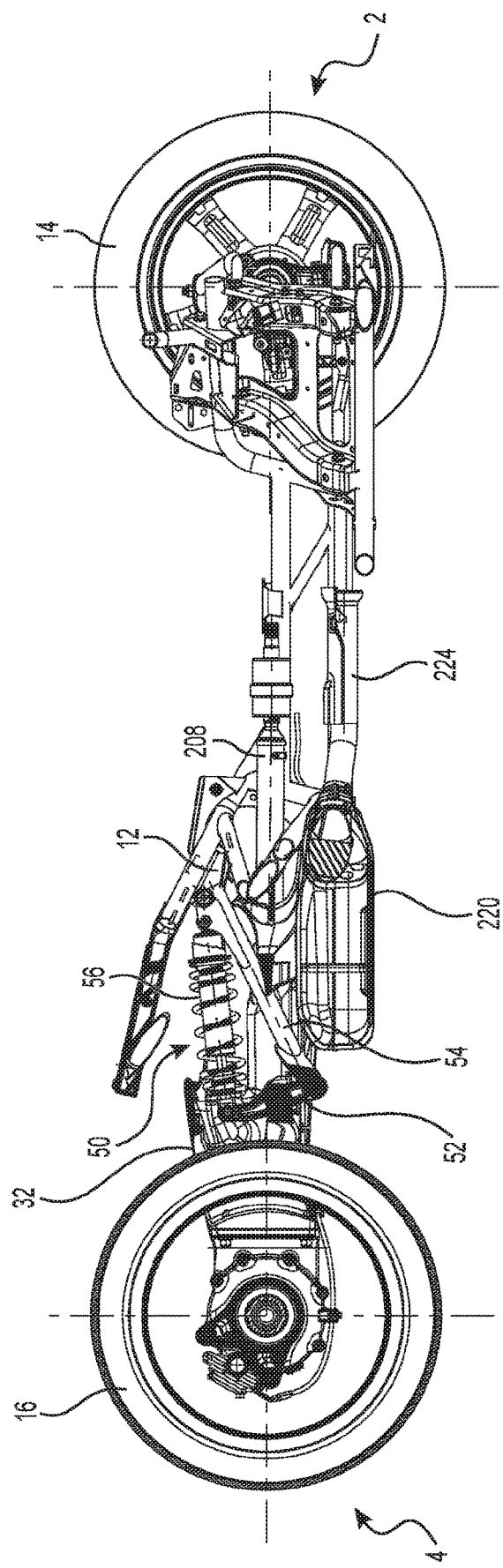
FIG. 9 is a cross-sectional view of the vehicle taken through line 9-9 of FIG. 5.
Figure 10:
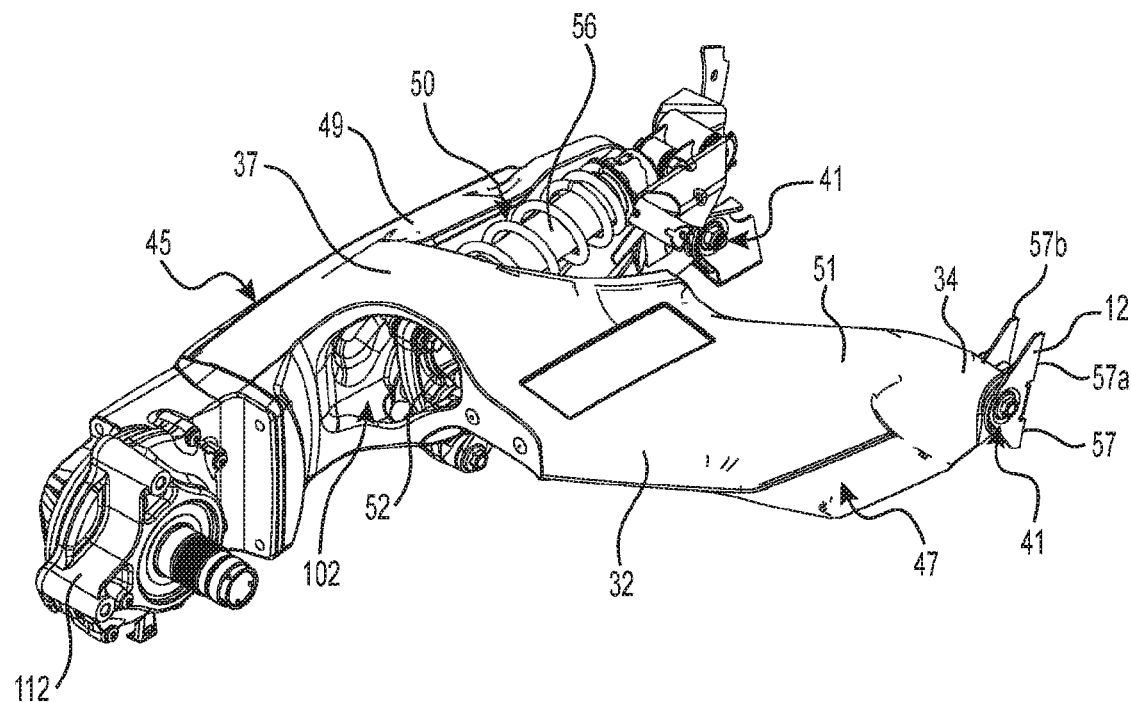
FIG. 10 is a rear, right side perspective view of the rear suspension assembly of the vehicle of FIG. 1.
Figure 11:
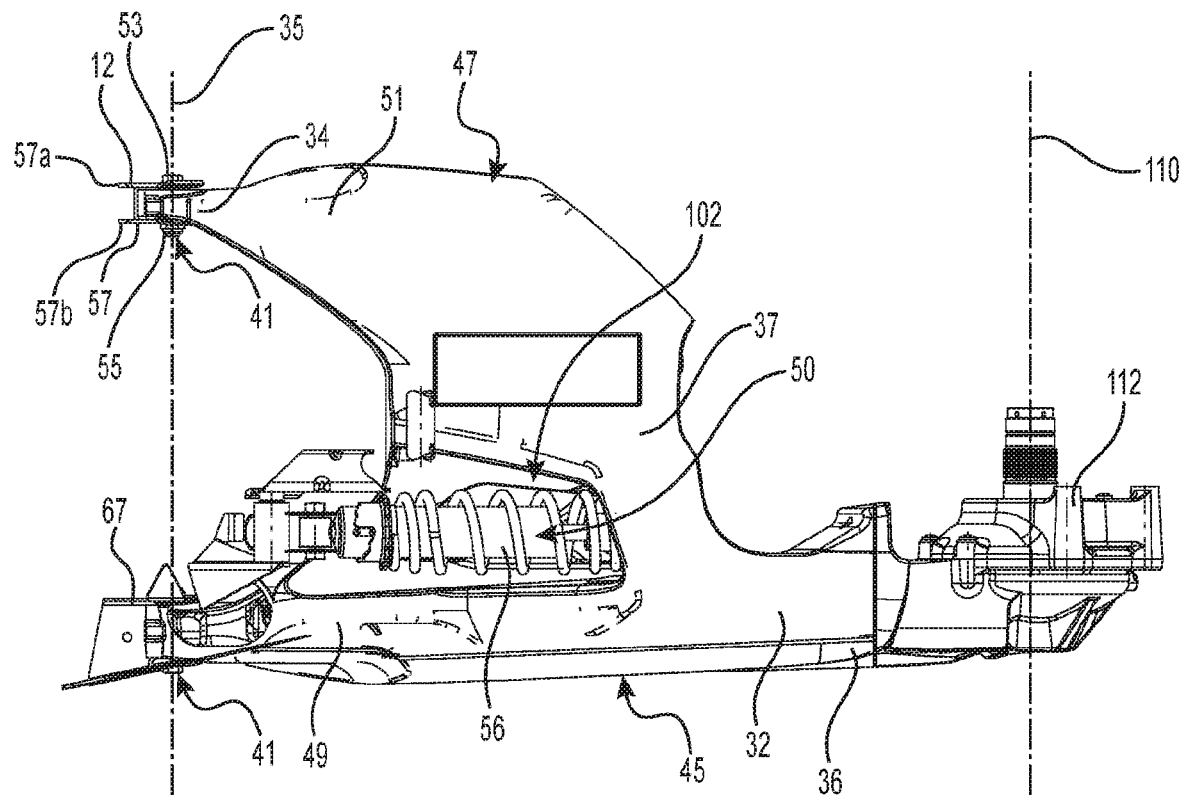
FIG. 11 is a top plan view of the rear suspension assembly of FIG. 10.
Figure 12:
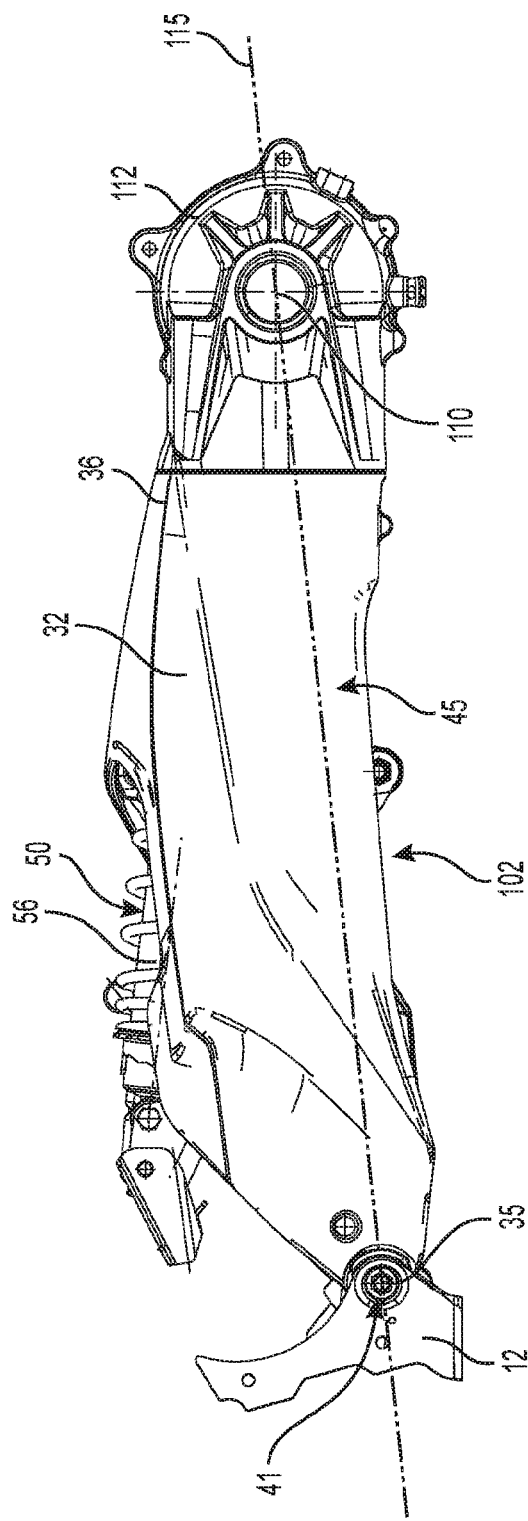
FIGS. 12 and 13 are right and left side elevation views respectively of the rear suspension assembly of FIG. 10.
Figure 13:
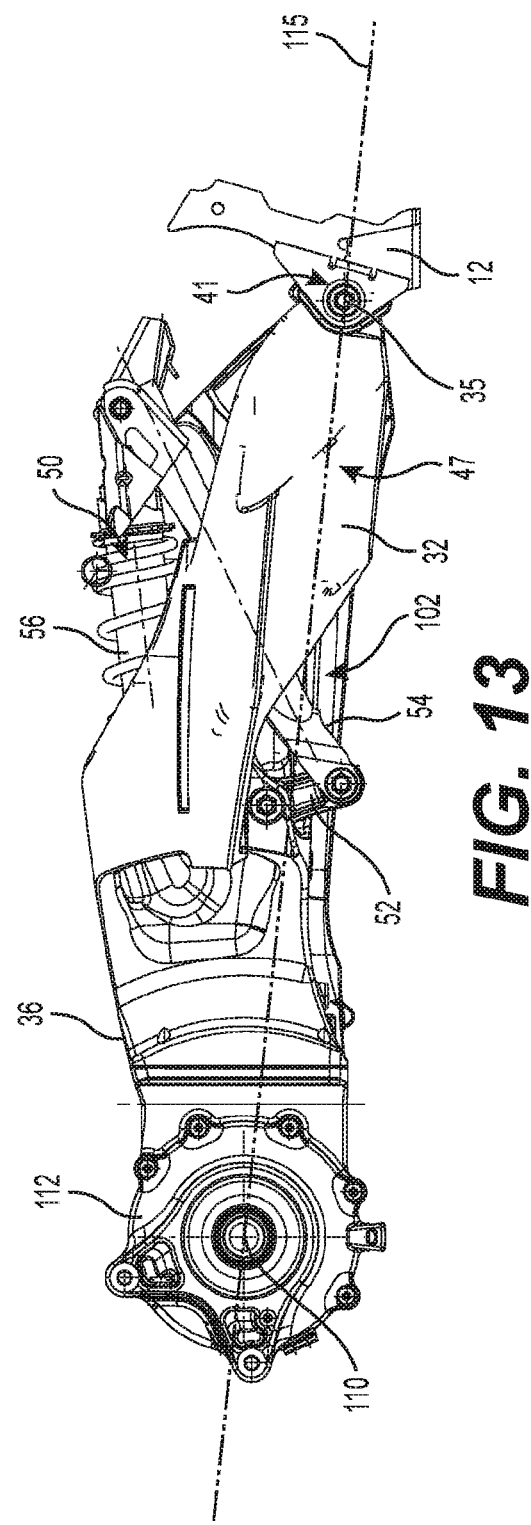

The swing arm pivots 41 define laterally-spaced mount points via which the swing arm 32 is pivotally mounted to the frame 12. The mount points are significantly spaced laterally from each other. Notably, in this implementation, as best seen in FIGS. 6 and 22, the swing arm pivots 41 are positioned laterally outward from left and right sides 230, 232 of the muffler 220. This helps strengthen the rear suspension assembly against the torsional loads that are encountered when the vehicle 10 is cornering. The swing arm pivots 41 may be configured in any suitable way. For example, with reference to FIGS. 10 and 11, in this implementation, a bracket 57 of the frame 12 receives a portion of the swing arm extension 51 between two flanges 57a, 57b of the bracket 57. A fastener 53 (e.g., a bolt) extends through the flanges 57a, 57b and the swing arm extension 51 and a fastener retaining member 55 (e.g., a nut) secures the fastener 53 in place. As shown in FIG. 11, the swing arm extension 49 is similarly connected to a bracket 67 of the frame 12. The swing arm 32 of the illustrated implementation is a mono swing arm, or single sided swing arm, which extends along and connects, via the final drive unit 112, to only one side of the rear wheel 16, although other types of swing arms are contemplated.

The rear suspension 50 is connected between the frame 12 and the swing arm 32. The rear suspension 50 comprises three members (which may be thought of as "links") including a rocker link 52, a linking arm 54 and a shock absorber 56 which, in a manner that will be explained in detail below, work together to control movement of the swing arm 32 relative to the frame 12 of the vehicle 10.

Figure 14:
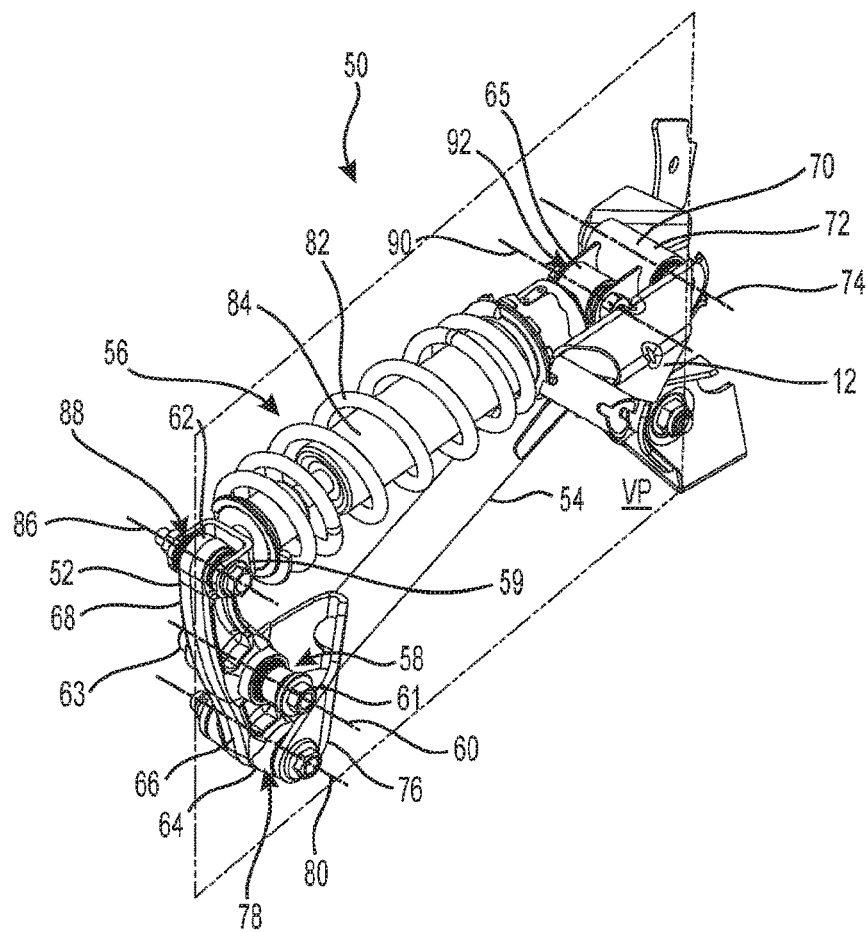
FIG. 14 is a rear, right side perspective view of a linkage subassembly of the rear suspension assembly.
Figure 15:
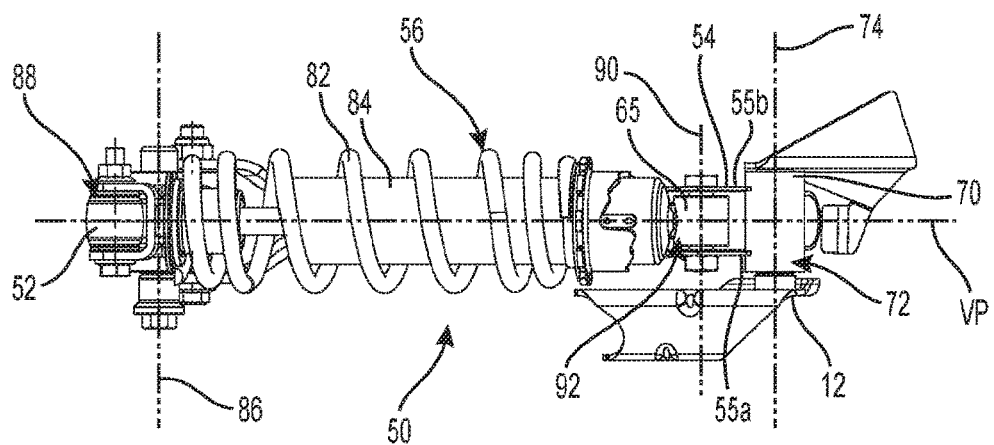
FIG. 15 is a top plan view of the linkage subassembly of FIG. 14.
Figure 16:
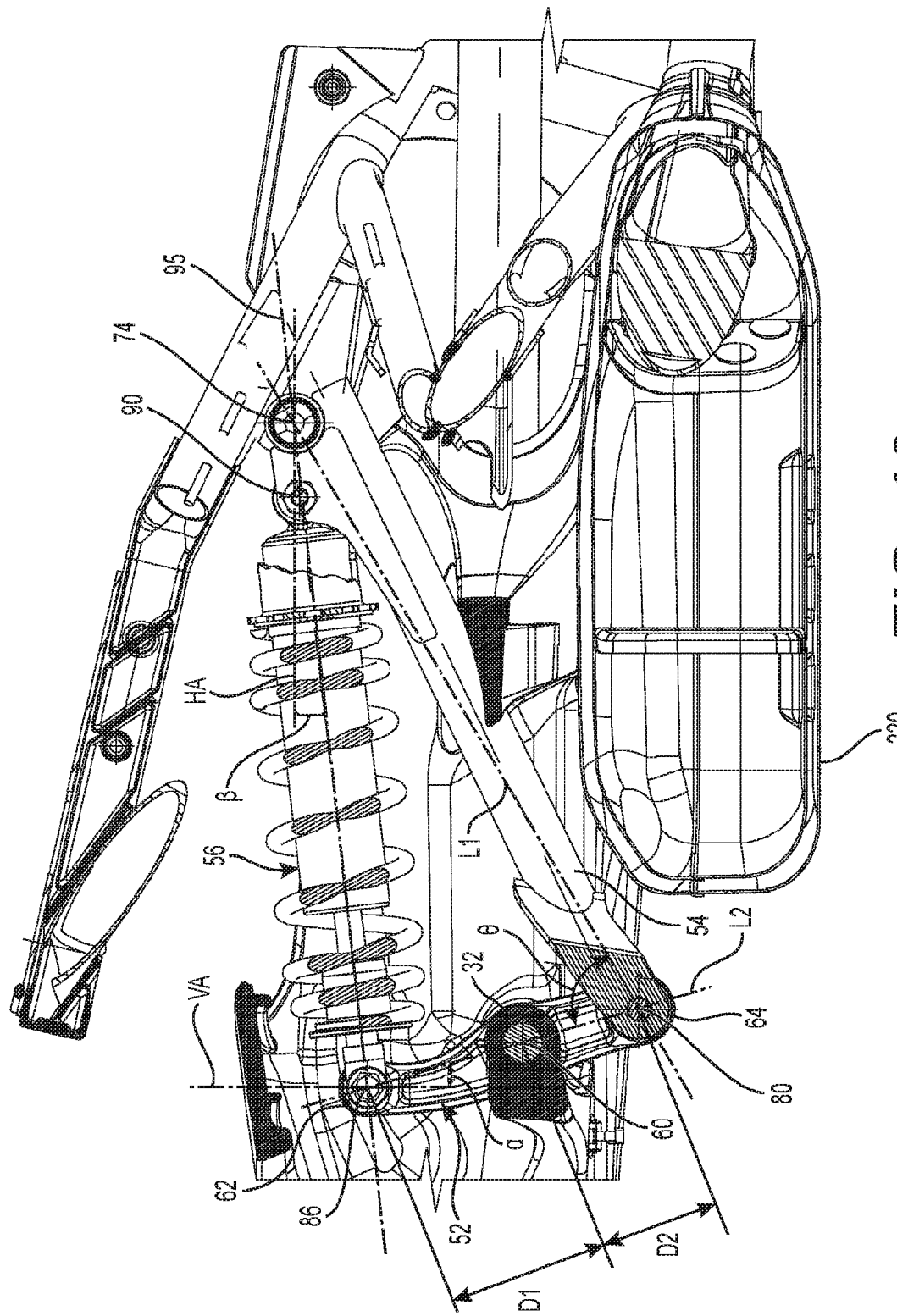
FIG. 16 is a detail view of a portion of the cross-sectional view of the vehicle shown in FIG. 9.

As best seen in FIGS. 14 to 16, the rocker link 52 is pivotally connected to the swing arm 32 about a rocker link pivot axis 60 that extends laterally and is defined by a rocker link pivot 58. The rocker link pivot 58 is located away from ends 62, 64 of the rocker link 52 such that the rocker link 52 has a first portion 66 and a second portion 68 which extend in divergent (e.g., opposite) directions from the rocker link pivot 58. The rocker link pivot 58 may be configured in any suitable way. For example, in this implementation, an opening of the rocker link 52 is configured to receive a fastener 61 (e.g., a bolt) that also engages an opening of the swing arm 32 such that the rocker link 52 can pivot about the rocker link pivot axis 60. The fastener 61 is secured in place by a corresponding fastener receiving member 63 (e.g., a nut). The rocker link pivot 58 may be established in any other suitable way in other implementations. For instance, any other securing element may be used instead of a fastener (e.g., a pin). It is also contemplated that the rocker link pivot 58 could have a bearing to facilitate the pivoting motion of the rocker link 52 relative to the swing arm 32.

The linking arm 54 is pivotally connected to the frame 12 and to the rocker link 52. More specifically, an end portion 70 of the linking arm 54 is pivotally connected to the frame 12 about a linking arm pivot axis 74 that extends laterally. As best seen in FIGS. 17 and 18, in this implementation, the linking arm pivot axis 74 is vertically higher than the swing arm pivot axis 35. An opposite end portion 76 of the linking arm 54 is pivotally connected to the first portion 66 of the rocker link 52 about a linking arm pivot axis 80 that extends laterally. The linking arm pivot axes 74, 80 are defined by linking arm pivots 72, 78 respectively. The linking arm pivots 72, 78 may be configured in any suitable manner. For instance, in this example, the end portion 70 of the linking arm 54 is positioned between two portions of the frame 12 and a fastener (such as the fastener 61) extends through the frame 12 and the end portion 70 to establish the linking arm pivot 72. The fastener is secured in place by a fastener receiving member (e.g., a nut). Moreover, in this example, the end portion 76 of the linking arm 54 is formed as a clevis which receives the end 64 of the rocker link 52 therebetween. A fastener (such as the fastener 61) extends through the clevis of the end portion 76 and engages a corresponding opening in the rocker link 52 to establish the linking arm pivot 78. The fastener is secured in place by a fastener receiving member (e.g., a nut).

The shock absorber 56 is configured to provide shock absorption to the rear suspension assembly 30. To that end, the shock absorber 56 comprises a spring 82 and a damper 84 mounted coaxially to one another. In this implementation, the spring 82 has a constant spring rate such that the spring 82 is configured to deflect a same amount for a given force throughout its range of deflection.

The shock absorber 56 is pivotally connected to the rocker link 52 and to at least one of the linking arm 54 and the frame 12. More particularly, in this implementation, an end portion 59 of the shock absorber 56 is pivotally connected to the second portion 68 of the rocker link 52 about a shock absorber pivot axis 86 that extends laterally. The shock absorber pivot axis 86 is defined by a shock absorber pivot 88 established between the rocker link 52 and the shock absorber 56. The shock absorber pivot 88 may be configured in any suitable way. For instance, with reference to FIG. 15, in this example, the end portion 59 of the shock absorber 56 constitutes a clevis end which receives the end 62 of the rocker link 52. A fastener (such as the fastener 61) is inserted through the clevis end of the shock absorber 56 and the end 62 of the rocker link 52. The fastener is secured in place by a fastener receiving member (e.g., a nut). The shock absorber pivot 88 may be configured in any other suitable way in other implementations.

In this implementation, an opposite end portion 65 of the shock absorber 56 is pivotally connected to the linking arm 54 about a shock absorber pivot axis 90 that extends laterally. As such, the shock absorber pivot axis 90 is offset from the linking arm pivot axis 74. The shock absorber pivot axis 90 is defined by a shock absorber pivot 92 established between the shock absorber 56 and the linking arm 54. The shock absorber pivot 92 may be configured in any suitable way. For instance, in this example, the end portion 65 of the shock absorber 56 is positioned between a pair of flanges 55a, 55b of the linking arm 54. A fastener (such as the fastener 61) is inserted through a mounting hole of the end portion 65 and through corresponding holes in the flanges 55a, 55b. The fastener is secured in place by a fastener receiving member (e.g., a nut). The shock absorber pivot 92 may be configured in any other suitable way in other implementations.

Thus, when the swing arm 32 pivots upwardly with respect to the frame 12 (e.g., when the rear wheel 16 climbs over an obstacle in its path), the linking arm 54 causes the rocker link 52 to pivot about the rocker link pivot axis 60 such that the end 62 of the rocker link 52 moves forwardly with respect to the swing arm 32. This causes compression of the shock absorber 56 as a distance between the shock absorber pivot axes 86, 90 decreases. For example, FIG. 17 illustrates such a movement of the swing arm 32 and the rear suspension 50. In particular, FIG. 17 shows the suspension assembly 30 in a "full bump" state in which the shock absorber 56 is compressed at its maximum (i.e., the distance between the shock absorber pivot axes 86, 90 is at its minimum). By way of contrast, FIGS. 4 to 9 show the suspension assembly 30 in a "driver loaded" state in which an average driver is seated on the vehicle 10 with the vehicle 10 at rest on level ground.

On the other hand, when the swing arm 32 pivots downwardly with respect to the frame 12 (e.g., when the rear wheel 16 encounters a depression in its path), the linking arm 54 causes the rocker link 52 to pivot about the rocker link pivot axis 60 such that the upper end 62 of the rocker link 52 moves rearwardly. This causes extension of the shock absorber 56 as the distance between the shock absorber pivot axes 86, 90 increases. For example, FIG. 18 illustrates such a movement of the swing arm 32 and the rear suspension 50. In particular, FIG. 18 shows the suspension assembly 30 in a "full droop" state in which the shock absorber 56 is extended at its maximum (i.e., the distance between the shock absorber pivot axes 86, 90 is at its maximum).

As such, the swing arm 32 is capable of pivoting significantly relative to the frame 12 about the swing arm pivot axis 35. For example, in this implementation, the swing arm 32 can pivot a total of 12.5° about the swing arm pivot axis 35 from the full droop state to the full bump state of the suspension assembly 30.

The rear suspension 50 may be configured to optimize performance of the shock absorber 56 in a relatively inexpensive manner.

As shown in FIG. 16, a distance D1 between the shock absorber pivot axis 86 and the rocker link pivot axis 60 is different from a distance D2 between the linking arm pivot axis 80 and the rocker link pivot axis 60. More specifically, the distance D1 is greater than the distance D2 such that, for a given rotation of the rocker link 52 about the rocker link pivot axis 60, the upper end 62 of the rocker link 52 moves a greater distance than the lower end 64 of the rocker link 52. Moreover, a distance between the linking arm pivot axes 74, 80 is configured to be greater than a distance between the shock absorber pivot axes 86, 90 in the driver loaded state.

Furthermore, an angle θ formed between the rocker link 52 and the linking arm 54 is configured to be relatively small. More specifically, the angle θ is formed between a line L1 and a line L2 which respectively extend between (i) the linking arm pivot axes 74, 80, and (ii) the linking arm pivot axis 80 and the shock absorber pivot axis 86. The angle θ is configured to be no more than 90° (i.e., 90° or less) independently of the load state of the suspension assembly 30. The angle θ is an acute angle in the driver loaded and full bump states of the suspension assembly 30.

This geometrical configuration of the rear suspension 50 may allow the shock absorber 56 to be compressed at a greater rate than if the shock absorber 56 were affixed directly between the frame 12 and the swing arm 32 as is typically the case in conventional suspension designs. In turn, given the greater rate of compression of the spring 82, the rear suspension assembly 30 exhibits a "rising" spring rate. In other words, as the suspension assembly 30 becomes harder to compress the more it is compressed, it is less likely to bottom out (i.e., travel its maximal compression limit). Thus, while the spring 82 of the shock absorber 56 has a constant (i.e., linear) spring rate, the rear suspension 50 behaves as having a spring with nonlinear spring rate that rises as the shock absorber 56 compresses. This may thus afford the benefits of a spring with a nonlinear spring rate (e.g., a progressive rate springs, variable rate springs, dual rate springs, etc.) without the added cost that is associated with such a spring. In addition, in this implementation, the vehicle 10 exhibits a "motion ratio" (i.e., a ratio of the displacement of the shock absorber 56 over the displacement of the rear wheel 16) that is greater than if the shock absorber 56 were affixed directly between the frame 12 and the swing arm 32.

The rear suspension 50 is configured to be relatively compact and to keep a center of gravity of the vehicle 10 relatively low.

For example, the shock absorber 56 may extend lower than in conventional suspension assembly designs. This may be achieved for example by ensuring that the linking arm 54 and the shock absorber 56 are mounted to the frame 12 at relatively low points such that the linking arm pivot axes 74, 80 (defined by the pivots 72, 78) and the shock absorber pivot axis 90 (defined by the pivot 92) are positioned relatively close to a lower end of the frame. This may in turn lower a center of gravity of the frame 12. In this implementation, the shock absorber 56 extends generally horizontally in the full bump state of the suspension assembly 30. For instance, as shown in FIG. 16, an axis 95 which extends through the shock absorber pivot axes 86, 90 defines a relatively small angle $\beta$ with respect to a horizontal axis HA. In the full bump state of the suspension assembly 30, as shown in FIG. 17, the angle $\beta$ may be no more than 30°, in some cases no more than 20°, in some cases no more than 10°, and in some cases even less. In this case, "generally horizontally" refers to the angle $\beta$ being offset no more than 30° from the horizontal axis HA.

Furthermore, the rocker link 52 extends relatively vertical. Notably, in this implementation, the second portion 68 of the rocker link 52 is vertically above the first portion 66 of the rocker link 52. More particularly, independently of the load state of the suspension assembly 30, the line L2 which passes through the shock absorber pivot axis 86 and the linking arm pivot axis 80 extends more vertically than horizontally. That is, as shown in FIG. 16, the line L2 defines an angle $\alpha$ with respect to a vertical axis VA that can be relatively small. The angle $\alpha$ is less than 45° irrespective of the load state of the suspension assembly 30 (i.e., in the full bump, full droop and driver loaded states of the suspension assembly 30). Independent of the load state of the suspension assembly 30, the angle $\alpha$ may be no more than 30°, in some cases no more than 20°, and in some cases even less (e.g., 15°). In this case, "more vertically than horizontally" refers to the angle $\alpha$ between the line L2 and the vertical axis VA being less than 45°.

Moreover, the components of the rear suspension 50 are relatively close to one another laterally. Notably, as shown in FIGS. 14 and 15, in this implementation, the rocker link 52, the linking arm 54 and the shock absorber 56 are laterally aligned with one another. More specifically, the rocker link 52, the linking arm 54 and the shock absorber 56 extend through a common vertical plane VP.

In addition, in this implementation, only one of the rocker link 52, the linking arm 54 and the shock absorber 56 is connected to the frame 12. In particular, of the rocker link 52, the linking arm 54 and the shock absorber 56, only the linking arm 54 is connected to the frame 12. This results in a reduction of mount points on the frame 12 which may facilitate assembly of the suspension assembly 30.

In this implementation, as shown in FIG. 16, the axis 95 extending through the shock absorber pivot axes 86, 90 intersects the linking arm pivot axis 74 independently of the load state of the suspension assembly 30. This may minimize bending of the linking arm 54.

In this implementation, the shock absorber 56 is disposed above the linking arm 54. This may be useful to protect the shock absorber 56 from damage by debris incoming from the ground. However, in other implementations, the positions of the shock absorber 56 and the linking arm 54 may be inverted (i.e., the shock absorber 56 may be disposed below the linking arm 54).

With reference to FIGS. 12, 13, 17 and 18, the linking arm 54 extends across a laterally extending plane 115 containing the swing arm pivot axis 35 and the wheel rotation axis 110. That is, the swing arm pivot axis 35 and the wheel rotation axis 110 extend along the plane 115 while the linking arm extends across the plane 115. As shown in FIGS. 17 and 18, the linking arm 54 extends across the plane 115 irrespective of the load state of the suspension assembly 30 (i.e., independent of whether the suspension assembly 30 is in its full bump state, full droop state or driver loaded state).

Given the compact configuration of the rear suspension 50, in this implementation, the swing arm 32 at least partially encloses the rear suspension 50. More particularly, as seen in FIGS. 10 to 13, 22 and 24, the swing arm 32 is hollow and defines a pocket 102 between an inner bottom wall 150, an inner top wall 152, an inner right lateral side wall 154, and an inner left lateral side wall 156. The rear suspension 50 is partly disposed in the pocket 102. In this implementation, each of the rocker link 52, the linking arm 54 and the shock absorber 56 at least partially extends within the pocket 102 defined by the swing arm 32. The rear suspension 50 is partially concealed by the swing arm 32 from the top, the left side and the right side of the vehicle 10. In other words, when the vehicle 10 is in operation on the ground and is viewed from any of the top, the left side and the right side of the vehicle 10 (i.e., in top, left side and right side orthogonal views of the vehicle 10), the swing arm 32 overlaps part of the rear suspension 50 thus blocking it from view. In this implementation, parts of each of the rocker link 52, the linking arm 54 and the shock absorber 56 are concealed by the swing arm 32 when viewed from the top, and the left and right sides of the vehicle 10.

The inner bottom wall 150 is larger than the inner top wall 152 such that a bottom side of the rear suspension 50 is more covered than a top side of the rear suspension 50. In particular, the shock absorber 56, which extends substantially on the top side of the rear suspension 50, is partially accessible from above for adjustment, maintenance or replacement purposes.

It is contemplated that, in alternative implementations, the rear suspension 50 could be entirely concealed by the swing arm 32 when viewed from the top, and the left and right sides of the vehicle 10.

Moreover, the compact configuration of the rear suspension 50 allows the muffler 220 of the exhaust system to be positioned relatively low. Notably, since the linking arm pivot axis 74 is vertically higher than the swing arm pivot axis 35, this allows additional space below the rear suspension 50 for the muffler 220. In particular, as shown in FIGS. 6 to 9, the muffler 220 extends below the rocker link 52, the linking arm 54 and the shock absorber 56. As such, the shock absorber 56 is positioned vertically between the muffler 220 and the straddle seat 20 such that the shock absorber 56 is higher than the muffler 220 but lower than the straddle seat 20.

The suspension assembly 30 may be configured differently in other implementations.

Figure 19:
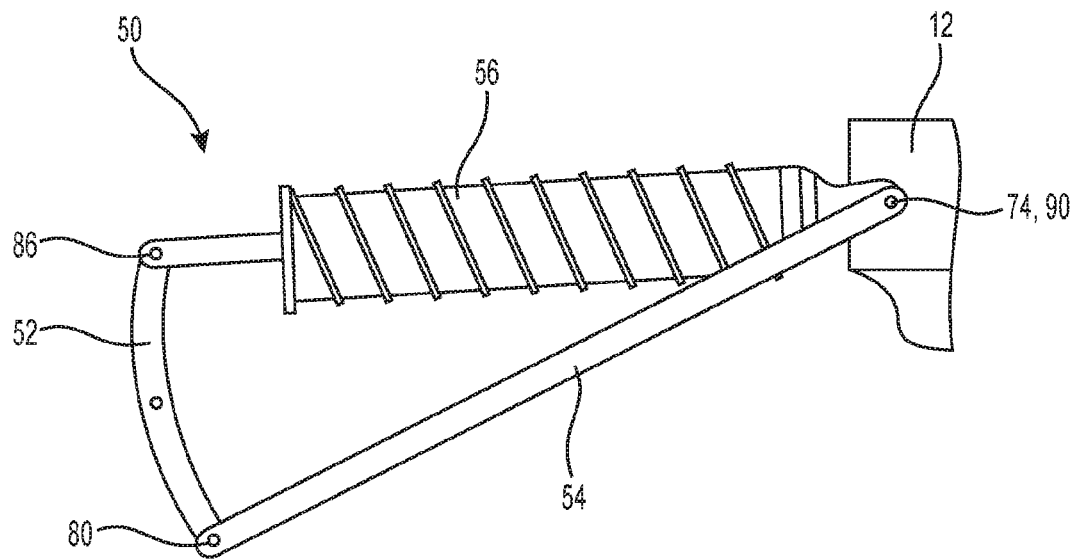
FIGS. 19 and 20 are schematic right side elevation views of alternate implementations of the linkage subassembly of the rear suspension assembly.

For instance, in the implementation shown in FIG. 19, each of the shock absorber 56 and the linking arm 54 is pivotally connected to the frame 12 about a common pivot axis. In other words, in this example, the linking arm pivot axis 74 about which the linking arm 54 is pivotally connected to the frame 12, and the shock absorber pivot axis 90 about which the shock absorber 56 is pivotally connected to the linking arm 54 are coaxial.

Figure 20:
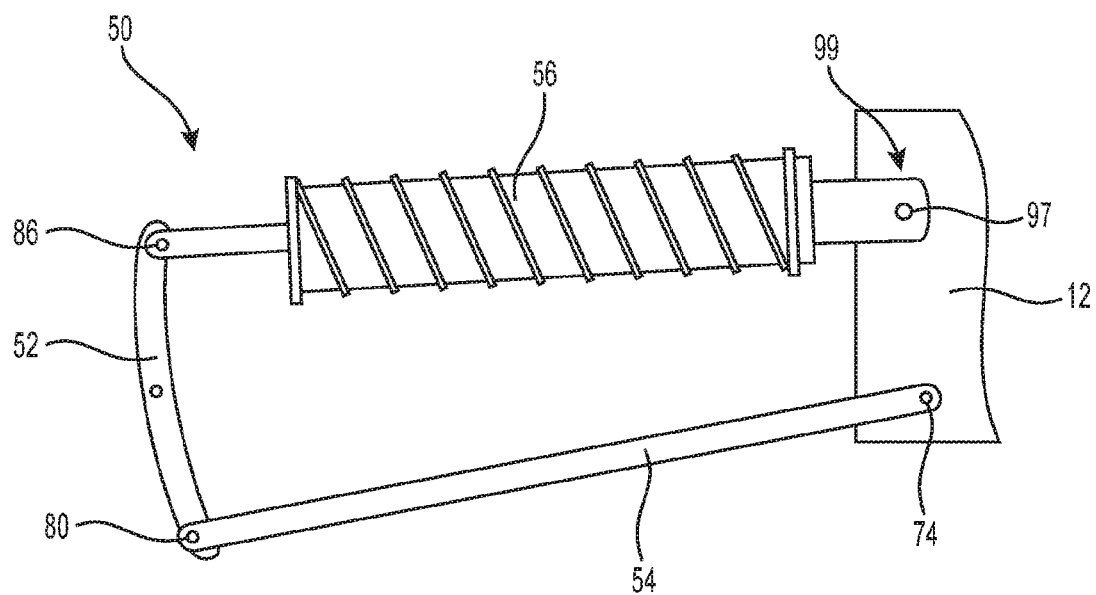

In the implementation shown in FIG. 20, rather than being pivotally connected to the linking arm 54, the shock absorber 56 is pivotally connected to the frame 12 about the shock absorber pivot axis 90. In this implementation, the shock absorber pivot axis 90 is located vertically higher than the linking arm pivot axis 74 about which the linking arm 54 is pivotally connected to the frame 12. In this example, the shock absorber pivot axis 90 is defined by a shock absorber pivot 99 established between the shock absorber 56 and the frame 12. In this implementation, the linking arm 54 is only pivotally connected to the frame 12 and the rocker link 52.

While in the implementations described above the suspension assembly 30 supports the rear wheel 16, the suspension assembly 30 may support any other suitable ground-engaging member in other implementations. For example, in the case where the suspension assembly 30 is implemented as a front suspension assembly of a snowmobile, a ski is connected to the distal end 36 of the swing arm 32 instead of a wheel. In such a case, the drive components of the wheel 16, such as the final drive unit 112 and the driveshaft 208, would not be implemented.

The vehicle 10 implemented in accordance with some non-limiting implementations of the present technology can be represented as presented in the following numbered clauses.

CLAUSE 1. A vehicle (10), comprising: a frame (12); two front ground-engaging members (14) connected to the frame (12); a rear ground-engaging member (16) connected to the frame (12); an engine (192) supported by the frame (12); a powertrain (100) operatively connecting the engine (192) to the rear ground-engaging member (16); a seat (20) connected to the frame (12); an exhaust system connected to the engine (192) and supported by the frame (12); a swing arm (32) operatively connecting the rear ground-engaging member (16) to the frame (12); and a rear suspension (50) operatively connected between the swing arm (32) and the frame (12), the seat (20) being positioned at least partially above the swing arm (32), the exhaust system being positioned at least partially below the swing arm (32), each of the rear suspension (50) and the powertrain (100) being at least partially concealed by the swing arm (32) from at least two of a top, a left side or a right side of the vehicle (10).

CLAUSE 2. The vehicle of clause 1, wherein: the powertrain (100) comprises a driveshaft (208) extending rearwardly from the engine (192); and at least a portion of the driveshaft (208) is concealed by the swing arm (32) from the at least two of the top, the left side and the right side of the vehicle (10).

CLAUSE 3. The vehicle of clause 1, wherein a majority of a length ($L_D$) of the driveshaft (208) is concealed by the swing arm (32) from the at least two of the top, the left side and the right side of the vehicle (10).

CLAUSE 4. The vehicle of clause 2 or 3, wherein: the swing arm (32) defines a channel (310); and the driveshaft (208) extends in the channel (310) of the swing arm (32).

CLAUSE 5. The vehicle of clause 4, wherein the channel (310) is bound by a top wall (312), a bottom wall (314), a left wall (316) and a right wall (318).

CLAUSE 6. The vehicle of clause 4 or 5, wherein the channel (310) extends along a majority of a length of the swing arm (32).

CLAUSE 7. The vehicle of any one of clauses 2 to 6, further comprising a final drive unit (112) connected to the swing arm (32) and operatively connected to the rear ground-engaging member (16), a rear end of the driveshaft (208) being connected to the final drive unit (112).

CLAUSE 8. The vehicle of clause 1, wherein: the exhaust system comprises a muffler (220); and at least a portion of the muffler (220) is positioned below the swing arm (32).

CLAUSE 9. The vehicle of clause 8, wherein the swing arm (32) has a top portion (37) and at least one lateral side portion (49, 51) extending downwardly from the top portion (37); and the at least one lateral side portion (49, 51) of the swing arm (32) is at least partially vertically aligned with a lateral side (230, 232) of the muffler (220).

CLAUSE 10. The vehicle of clause 9, wherein: the at least one lateral side portion (49, 51) of the swing arm (32) includes a left lateral side portion (49) and a right lateral side portion (51); the left lateral side portion (49) being at least partially vertically aligned with a left side (230) of the muffler (220); and the right lateral side portion (51) being at least partially vertically aligned with a right side (232) of the muffler (220).

CLAUSE 11. The vehicle of clause 1, wherein: the swing arm (32) defines a pocket (102) bound by a top wall (152), a bottom wall (150), a left lateral side wall (156) and a right lateral side wall (154) of the swing arm (32); and the rear suspension (50) is at least partially received in the pocket (102) of the swing arm (32).

CLAUSE 12. The vehicle of clause 1, wherein: the exhaust system comprises a muffler (220); the rear suspension (50) comprises a shock absorber (56); and the shock absorber (56) is positioned vertically between the muffler (220) and the seat (20).

CLAUSE 13. The vehicle of clause 1, wherein: the exhaust system comprises a muffler (220) having a left side (230) and a right side (232); the swing arm (32) is pivotally mounted to the frame (12) via at least two laterally-spaced mount points; and the mount points are positioned laterally outward from the left and right sides (230, 232) of the muffler (220).

CLAUSE 14. The vehicle of any one of clauses 1 to 13, wherein the at least two of the top, the left side or the right side of the vehicle (10) includes the left and right sides of the vehicle (10).

CLAUSE 15. The vehicle of any one of clauses 1 to 13, wherein the at least two of the top, the left side or the right side of the vehicle (10) includes the top and the left side of the vehicle (10).

CLAUSE 16. The vehicle of any one of clauses 1 to 13, wherein the at least two of the top, the left side or the right side of the vehicle (10) includes the top and the right side of the vehicle (10).

CLAUSE 17. The vehicle of any one of clauses 14 to 16, wherein the at least two of the top, the left side or the right side of the vehicle (10) includes the top, the left side and the right side of the vehicle (10).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle, comprising:
a frame;
two front ground-engaging members connected to the frame;
a rear ground-engaging member connected to the frame;
an engine supported by the frame;
a powertrain operatively connecting the engine to the rear ground-engaging member;
a seat connected to the frame;
an exhaust system connected to the engine and supported by the frame, the exhaust system comprising a muffler;
a swing arm operatively connecting the rear ground-engaging member to the frame; and
a rear suspension operatively connected between the swing arm and the frame,
the seat being positioned at least partially above the swing arm,
at least a portion of the muffler of the exhaust system being positioned below the swing arm,
each of the rear suspension and the powertrain being at least partially concealed by the swing arm from at least two of a top, a left side or a right side of the vehicle.

2. The vehicle of claim 1, wherein:
the powertrain comprises a driveshaft extending rearwardly from the engine; and
at least a portion of the driveshaft is concealed by the swing arm from the at least two of the top, the left side and the right side of the vehicle.

3. The vehicle of claim 2, wherein a majority of a length of the driveshaft is concealed by the swing arm from the at least two of the top, the left side and the right side of the vehicle.

4. The vehicle of claim 2, wherein:
the swing arm defines a channel; and
the driveshaft extends in the channel of the swing arm.

5. The vehicle of claim 4, wherein the channel extends along a majority of a length of the swing arm.

6. The vehicle of claim 2, further comprising a final drive unit connected to the swing arm and operatively connected to the rear ground-engaging member, a rear end of the driveshaft being connected to the final drive unit.

7. The vehicle of claim 1, wherein:
the swing arm has a top portion and at least one lateral side portion extending downwardly from the top portion; and
the at least one lateral side portion of the swing arm is at least partially vertically aligned with a lateral side of the muffler.

8. The vehicle of claim 7, wherein:
the at least one lateral side portion of the swing arm includes a left lateral side portion and a right lateral side portion;
the left lateral side portion being at least partially vertically aligned with a left side of the muffler; and
the right lateral side portion being at least partially vertically aligned with a right side of the muffler.

9. The vehicle of claim 1, wherein:
the swing arm defines a pocket bound by a top wall, a bottom wall, a left lateral side wall and a right lateral side wall of the swing arm; and
the rear suspension is at least partially received in the pocket of the swing arm.

10. The vehicle of claim 1, wherein:
the rear suspension comprises a shock absorber; and
the shock absorber is positioned vertically between the muffler and the seat.

11. The vehicle of claim 1, wherein:
the muffler has a left side and a right side;
the swing arm is pivotally mounted to the frame via at least two laterally-spaced mount points; and
the mount points are positioned laterally outward from the left and right sides of the muffler.

12. The vehicle of claim 1, wherein the at least two of the top, the left side or the right side of the vehicle includes the left and right sides of the vehicle.

13. The vehicle of claim 12, wherein the at least two of the top, the left side or the right side of the vehicle includes the top, the left side and the right side of the vehicle.

14. The vehicle of claim 1, wherein the at least two of the top, the left side or the right side of the vehicle includes the top and the left side of the vehicle.

15. The vehicle of claim 1, wherein the at least two of the top, the left side or the right side of the vehicle includes the top and the right side of the vehicle.

16. A vehicle, comprising:
a frame;
two front ground-engaging members connected to the frame;
a rear ground-engaging member connected to the frame;
an engine supported by the frame;
a powertrain operatively connecting the engine to the rear ground-engaging member;
a seat connected to the frame;
an exhaust system connected to the engine and supported by the frame;
a swing arm operatively connecting the rear ground-engaging member to the frame, the swing arm defining a pocket bound by a top wall, a bottom wall, a left lateral side wall and a right lateral side wall of the swing arm; and
a rear suspension operatively connected between the swing arm and the frame, the rear suspension being at least partially received in the pocket of the swing arm,
the seat being positioned at least partially above the swing arm,
the exhaust system being positioned at least partially below the swing arm,
each of the rear suspension and the powertrain being at least partially concealed by the swing arm from at least two of a top, a left side or a right side of the vehicle.

17. The vehicle of claim 16, wherein the at least two of the top, the left side or the right side of the vehicle includes the left and right sides of the vehicle.

18. The vehicle of claim 17, wherein the at least two of the top, the left side or the right side of the vehicle includes the top, the left side and the right side of the vehicle.

19. The vehicle of claim 16, wherein the at least two of the top, the left side or the right side of the vehicle includes the top and the left side of the vehicle.

20. The vehicle of claim 16, wherein the at least two of the top, the left side or the right side of the vehicle includes the top and the right side of the vehicle.

* * * * *